United States Patent
Fong et al.

(10) Patent No.: US 7,814,248 B2
(45) Date of Patent: *Oct. 12, 2010

(54) COMMON ACCESS RING/SUB-RING SYSTEM

(75) Inventors: Lambert Fong, San Ramon, CA (US); David L. Dooley, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/608,239

(22) Filed: Dec. 7, 2006

(65) Prior Publication Data

US 2008/0140892 A1    Jun. 12, 2008

(51) Int. Cl.
*G06F 13/00* (2006.01)
*G06F 13/36* (2006.01)
*G06F 15/16* (2006.01)

(52) U.S. Cl. .................. 710/110; 710/306; 709/251

(58) Field of Classification Search .............. 710/110, 710/306, 311–313; 709/208–211, 218, 249–251
See application file for complete search history.

(56) References Cited

U.S. PATENT DOCUMENTS

| | | | | |
|---|---|---|---|---|
| 3,731,002 A | * | 5/1973 | Pierce | 370/237 |
| 3,742,144 A | * | 6/1973 | Brandenburg et al. | 370/405 |
| 3,890,471 A | * | 6/1975 | Hachenburg, Victor | 370/405 |
| 4,287,592 A | * | 9/1981 | Paulish et al. | 370/403 |
| 4,354,226 A | * | 10/1982 | Flickinger et al. | 709/251 |
| 4,482,999 A | * | 11/1984 | Janson et al. | 370/452 |
| 4,539,679 A | * | 9/1985 | Bux et al. | 370/405 |
| 4,602,365 A | * | 7/1986 | White et al. | 370/454 |
| 4,621,362 A | * | 11/1986 | Sy | 370/403 |
| 4,680,756 A | * | 7/1987 | Sugimoto et al. | 370/402 |
| 4,811,009 A | * | 3/1989 | Orimo et al. | 370/403 |
| 4,821,174 A | * | 4/1989 | Webb et al. | 710/107 |
| 4,879,550 A | * | 11/1989 | Hino et al. | 370/403 |
| 5,253,252 A | * | 10/1993 | Tobol | 370/452 |
| 5,327,431 A | * | 7/1994 | Heske et al. | 370/403 |
| 5,374,926 A | * | 12/1994 | Szczepanek | 340/825.52 |
| 5,392,399 A | * | 2/1995 | Gilbrech | 709/245 |
| 5,485,578 A | * | 1/1996 | Sweazey | 709/224 |
| 5,870,387 A | * | 2/1999 | Mulla | 370/258 |

(Continued)

FOREIGN PATENT DOCUMENTS

JP    01176138 A  *  7/1989

*Primary Examiner*—Thomas J Cleary
(74) *Attorney, Agent, or Firm*—Bever Hoffman & Harms LLP

(57) ABSTRACT

A common access ring (CAR) network includes a main ring and one or more sub-rings. The main ring includes one or more masters, one or more slaves, and one or more bridges. Each sub-ring is coupled to the main ring through a corresponding bridge. Each node of the CAR network is assigned a unique identifier, thereby implementing a global flat address space. One or more masters may issue requests on the CAR network, such that multiple transactions are simultaneously pending. Multiple masters may simultaneously issue requests to the same slave. However, each master cannot make more than one request at a time, and must wait until a current request is completed before making another request. The ring architecture ensures that no more than one request arrives at a slave at any given time. Requests received by busy slaves are returned to the originating masters, and may be subsequently re-sent.

22 Claims, 10 Drawing Sheets

U.S. PATENT DOCUMENTS

| | | | |
|---|---|---|---|
| 6,091,705 A * | 7/2000 | Regula | 370/223 |
| 6,343,331 B1 * | 1/2002 | Stirling | 709/251 |
| 6,795,446 B2 * | 9/2004 | Matsumoto et al. | 370/404 |
| 7,085,857 B2 * | 8/2006 | Rust et al. | 710/13 |
| 2003/0165119 A1 * | 9/2003 | Hsu et al. | 370/258 |
| 2003/0167348 A1 * | 9/2003 | Greenblat | 709/251 |
| 2004/0088436 A1 * | 5/2004 | Katta et al. | 709/248 |
| 2006/0136604 A1 * | 6/2006 | Schultze et al. | 709/251 |

* cited by examiner

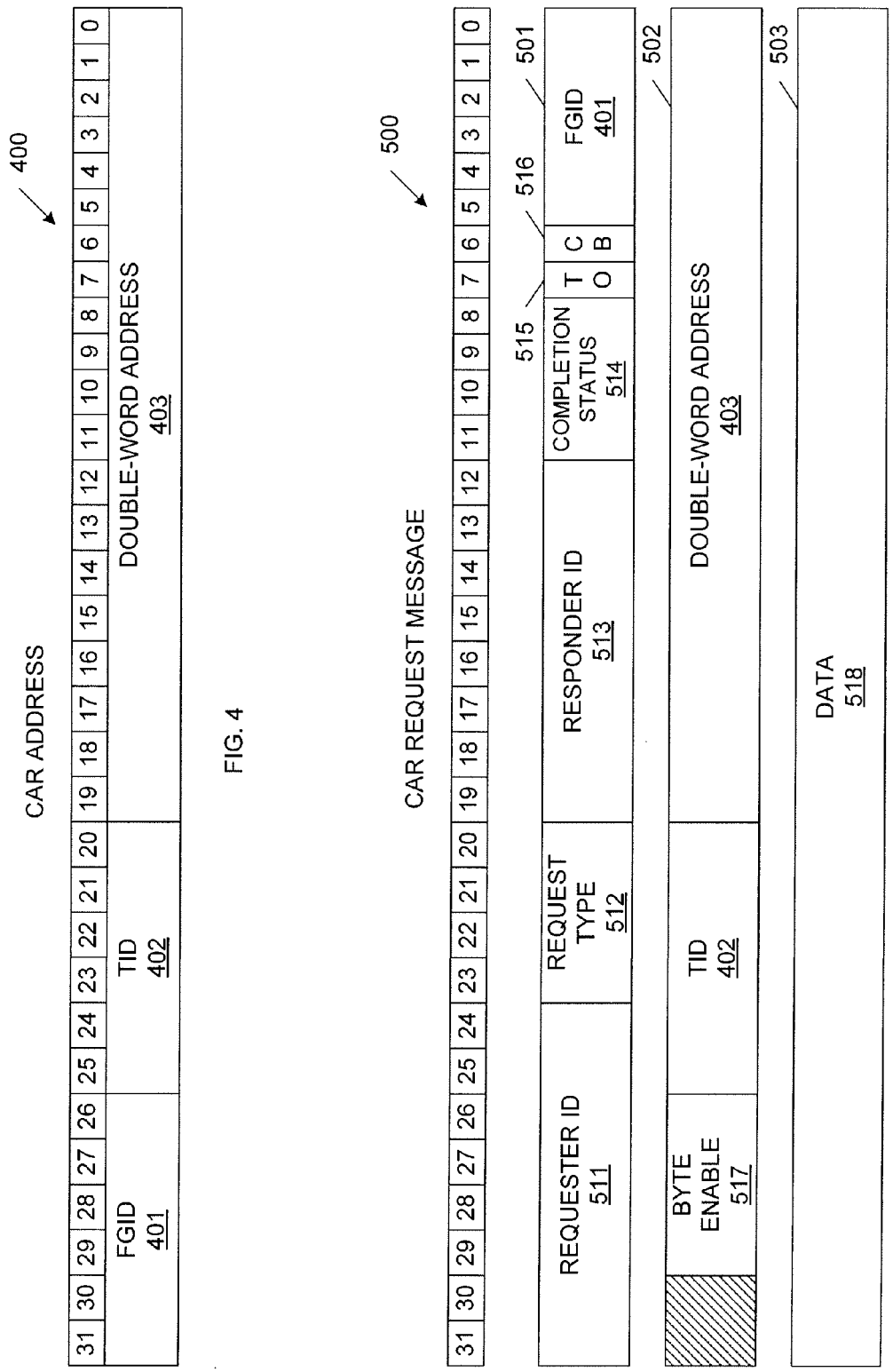

COMMON ACCESS RING/SUB-RING SYSTEM

BACKGROUND OF THE INVENTION

1. Field of the Invention

The present invention relates to a ring-based architecture for providing access to internal registers and/or memories located on an integrated circuit chip.

2. Related Art

Most reasonably complex chip designs require software access to internal registers/memories for initialization, configuration, status retrieval and debugging purposes. Such register/memory access been provided in many different ways in the past.

FIG. 1 is a block diagram of a conventional chip 100, which includes register/memory access logic 101, functional blocks 111-113, management port 121, SM bus master 131 and SM bus slave 132. Functional blocks 111-113 include registers and/or memory, which can be accessed directly via a functional path, or indirectly through register/memory access logic 101. Indirect access is facilitated by interface modules, such as management port 121, SM bus master 131 and SM bus slave 132, which are coupled to register/memory access logic 101.

Direct access is achieved by an off-chip controller 140, which can be, for example, a root complex coupled to functional block 113 via a functional path, such as a PCIe port or an AS port.

Indirect access can be achieved by another off-chip controller 150 (e.g., on-board processor) coupled to management port 121 via a management path, such as a PCIe port. Indirect access can also be achieved by yet another off-chip controller 152 (e.g., SM bus master) coupled to SMbus slave 132 via a SM bus. Indirect access can also be achieved through SM bus master 151, which is coupled to an external EEPROM 151 (e.g., SM bus slave) via a SM bus.

Register/memory access logic 101 can be implemented in many different manners. For example, all registers/memories on chip 100 may be centrally located, and access to these registers/memories can be performed by a single controller within register/memory access logic 101. While this scheme is conceptually simple, large physical design constraints are placed on the overall chip design. For example, the inputs of all the registers/memories need to be routed through the chip from where they are sourced. Likewise, the outputs of all the registers/memories need to be routed through the chip to where they are used. Thus, an excessive number of wires may be required, thereby making the timing of this scheme difficult to implement.

Registers/memories can also be distributed in many separate modules that are all connected by a single parallel bus. Logic attempting to access the distributed registers/memories must arbitrate with other logic to gain access to the parallel bus. This scheme places the registers/memories close to where they are used, and thus reduces both wiring and timing issues. However, the parallel bus must be relatively large, both in terms of bus width and distance traversed by the bus on the chip. With such a configuration, a large number of slaves and masters coupled to the parallel bus will create loading and timing problems. Moreover, only one transaction can occur at any given time with the scheme. In addition, a central arbiter may be required for the various masters to arbitrate for the parallel bus.

It would therefore be desirable to have an access system having a generic and flexible architecture and design, such that the access system can be reused in multiple chip designs. It would further be desirable for the access system to provide a mechanism for accessing all of the accessible on-chip registers and memory locations in a uniform manner. It would also be desirable if the access system is transparent to the chip designer whose application modules require access to the on-chip registers and memory locations, such that the designer only needs to input a list of register/memory locations and the associated addresses prior to connecting the module to the access system. It would also be desirable for the access system to be optimized in terms of area and routing, and also operate with a reasonable latency.

SUMMARY

The present invention provides a common access ring (CAR) architecture, which includes a plurality of registers/memories distributed in many modules. A ring structure is used to connect all masters (access requesters) and slaves (registers/memories). A transaction request is sent from a master through the ring to a slave. The slave services the request and the master is notified of the completion. This scheme has fewer wires and timing problems because data through the ring is staged in the master and slave. Although the CAR architecture exhibits a relatively large latency (i.e., the time required to complete a transaction), this latency is acceptable because the ring structure is used to perform operations such as configuration, initialization, status retrieval and debugging, which are not as time critical as data flowing through the functional path of the chip (e.g., packet traffic flow through a switch).

The present invention provides a common access ring (CAR) which includes the following properties. The CAR supports a single flat global address space on a chip, wherein all CAR accessible register/memory locations are mapped to this single address space. The CAR supports multiple CAR masters and multiple CAR slaves. The CAR also supports multiple transactions on the ring at the same time, thereby enabling one or more CAR masters to make a request at the same time. Moreover, multiple CAR masters may simultaneously make a request to the same CAR slave. No more than one request arrives at a CAR slave at any given time. However, a request may arrive at a CAR slave while the CAR slave is still processing a previous request, as the CAR slave may require multiple cycles to process the previous request.

Each CAR slave can only handle one request at a time. If a CAR slave is processing a previous request when another request arrives, the arriving request will not be serviced and the CAR master that originated the arriving request will be asked to retry the request at a later time. Each CAR master cannot make more than one request at a time, and must wait until a current request is completed before making another request.

The CAR supports shadow-write operations, which are used when writing to a register in the chip that, for chip design and implementation reasons, has one or more shadow copies (i.e., shadow registers). The accessing software provides the global address of the real register that is the target of the write operation. In response, the CAR automatically writes the same value to the real register specified by the global address and to all shadow copies associated with the real register in different areas of the chip.

Each shadow copy has a unique global address, and can therefore be read individually for debugging purposes. However, each shadow copy cannot be written individually using the associated global address. In fact, the address decoding logic of the CAR detects and ignores direct write operations to the shadow copies. This prevents the real register and the associated shadow copies from going out of synchronization.

Each shadow write operation is atomic. This means that a write request to a real register and all of the associated shadow copies must be completed before another write request to the same real register is allowed to proceed. This also prevents the real register and the associated shadow copies from going out of synchronization.

In one embodiment, an application module provides an interface between the CAR and the external management module. The application module can be connected to the CAR through a CAR master, a CAR slave, or both.

The CAR does not rely on a single controller, but can operate in response to multiple controllers. In addition, the CAR does not utilize a central arbiter (which would make expansion difficult, be limited to one transaction at a time, and require a long wait time for grant if there are many masters). Moreover, the CAR does not implement a shared bus architecture, thereby eliminating the problems associated with this type of architecture. Furthermore, the CAR does not use a token-ring approach (which is limited to one transaction at a time, and requires a token to pass through all nodes, resulting in a high latency).

The present invention will be more fully understood in view of the following description and drawings.

BRIEF DESCRIPTION OF THE DRAWINGS

FIG. 4 is a schematic diagram of a 32-bit global CAR address in accordance with one embodiment of the present invention.

FIG. 5 is a schematic diagram of a CAR message in accordance with one embodiment of the present invention.

DETAILED DESCRIPTION

Figure 1:
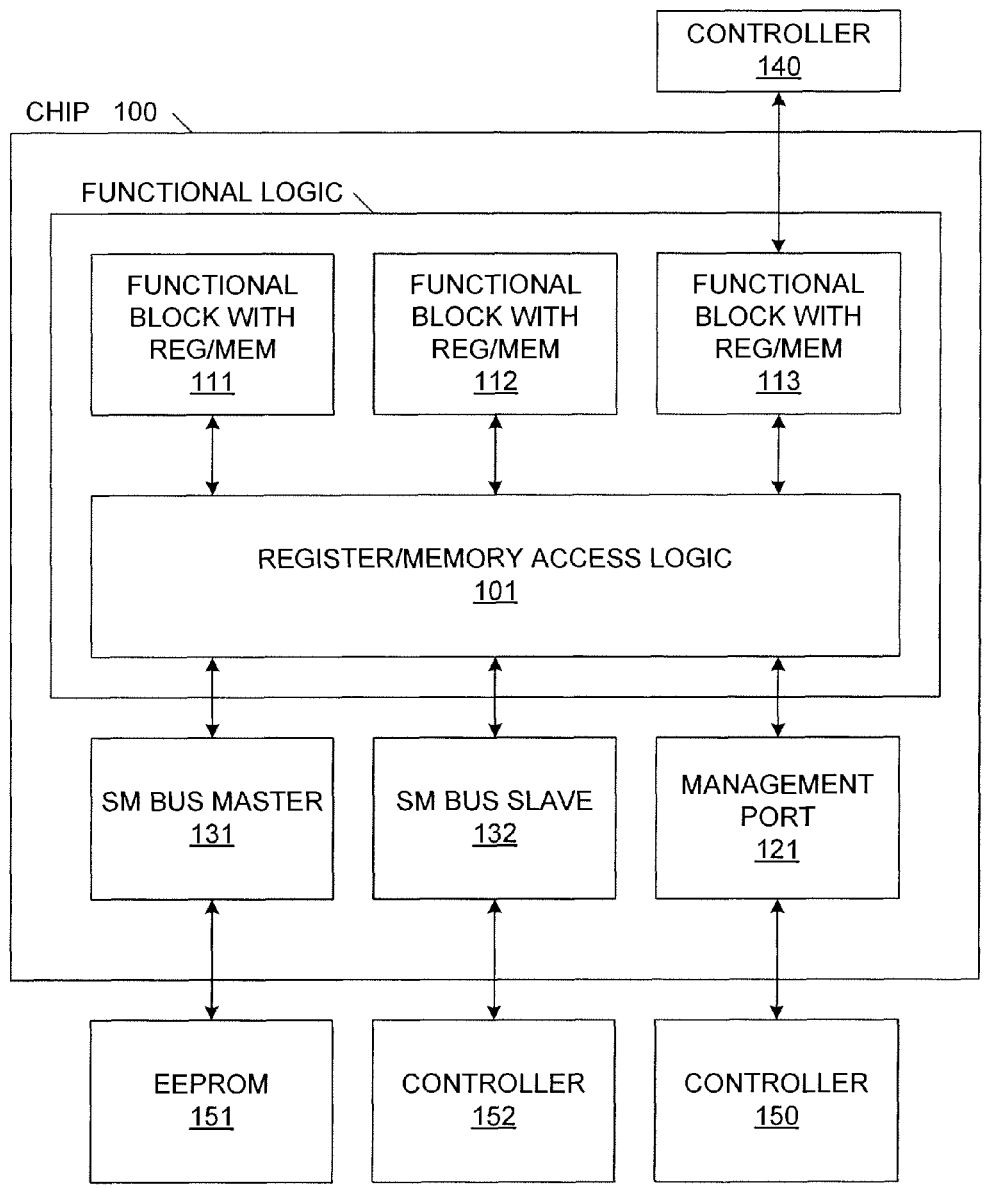
FIG. 1 is a block diagram of a conventional integrated circuit chip, which includes register/memory access logic, functional blocks, a management port, a bus master, and a bus slave.

As used herein, software or management software refers to any controlling entity that wants access to the on-chip registers/memories. Such software or management software can include, for example, a software, firmware or device driver running in a processor, a software, firmware or device driver running in a controller (mainly for debugging purposes), or a module inside the chip which acts as a chip initialization controller.

The present invention provides a Common Access Ring (CAR) architecture, which exhibits a ring structure. Different numbers and different types of nodes can be placed on the CAR. These nodes are daisy-chained together to form the ring. Control and data of the ring are packaged together and sent from node to node in the form of a message. The ring is unidirectional, such that messages always travel in one direction within a ring. Messages are transmitted from a node via a downstream ring interface and are received at the next node via an upstream ring interface.

In general, a request message is sent downstream from a node through each subsequent node on the ring. The request message will be serviced only by the slave node(s) that manages the register/memory location specified by the address in the message. The response from the slave is forwarded through the ring to the requester.

There are 6 major components in the CAR architecture, including a common access ring master (CAR master or CARM), a common access ring slave (CAR slave or CARS), a common access ring bridge (CAR bridge or CARB), a common access ring pad (CAR pad or CARP), the actual wires that connect each node in the CAR, and application modules (APP).

The CAR master is a node on the ring that generates read/write request messages to the CAR slaves on the ring.

The CAR slave is a node on the ring that receives and services read/write requests from the CAR masters on the ring. The CAR slave (along with the associated application module) handles all address decoding and has access to the registers/memories that are within its address space.

The CAR bridge is a node on the ring required to implement a ring-of-rings topology (which is described in more detail below). The CAR bridge is not required for basic ring usage (i.e., a single-ring topology). The ring-of-rings topology is intended for chips that have so many CAR masters and CAR slaves that latency will be too high if all of these masters and slaves are connected together in a single-ring topology.

The CAR bridge provides a connection between a main-ring and a sub-ring in a ring-of-rings topology. Nodes in each sub-ring are chosen in view of access locality, such that most access transactions can be fulfilled inside a sub-ring, such that most access transactions do not need to traverse nodes in other sub-rings. In this manner, latency is greatly reduced. A sub-ring is also used to connect all the CAR slaves that have access to 'real' registers and their shadow copies (i.e., a shadow-copy group). Using a sub-ring to host all of the shadow copies enables shadow-write operations to be atomic.

The CAR pad is a node on the ring used to resolve physical design problems where a section of the ring (i.e. the wires) between two nodes is so long that it cannot meet timing. In this case, a CAR pad is added between the two nodes to add a staging point in the path, wherein a cycle is added. The CAR pad in no way affects the traffic on the ring except for the addition of a single cycle delay. Note that the CAR pad may be used in a single-ring topology as well as a ring-of-rings topology. The CAR pad is typically not needed for normal ring usage.

The only concern of the actual wires that connect the nodes in the CAR is that these wires must meet the timing of a single cycle between two nodes. If this cannot be achieved because of the locations of two nodes in the chip, then a CAR pad can be inserted to resolve the long path problem.

Application modules are the functional modules created by the designer of the chips. The application modules can be viewed as the 'user' of the CAR. In general, there are two types of CAR users. One type of application module requires access to the registers/memories on the chip utilizing the CAR. This type of application module will connect to the CAR masters. The other type of application module provides access to the registers/memories on the chip utilizing the CAR. This type of application module will connect to the CAR slaves.

If an application module requires access to some registers/memories that it does not control (i.e., these registers/memories reside in another application module), and must also provide other application modules access to some registers/memories that it does control, then this single application module will connect to both a CAR master and a CAR slave.

More detailed descriptions of the CAR master, CAR slave, CAR bridge, CAR pad and application module components are provided later in this specification.

To help chip designers create application modules that communicate with the CAR slaves in a consistent manner, a script (CAR Script) is provided. The CAR Script generates the portion of an application module that talks to a corresponding CAR slave. The user provides the address, width, and attributes of all registers/memories in the application module to the CAR script. In response, the CAR script generates a sub-module that contains register flip-flops, address decode logic, and interface logic to the CAR slave. At this point, all the user needs to do is instantiate the generated sub-module in the application module to fully utilize the functionality of the CAR. In accordance with one embodiment, the CAR Script also generates a Verilog/Vera test bench to test the register/memory access.

Various CAR topologies will now be described in more detail. The CAR design is generic and flexible such that the CAR architecture can be used by different chips. The complexity of the chips in which the CAR is deployed can vary greatly. Consequently, the number of nodes and/or the latency requirements can be different on different chips. To support these diverse requirements, the CAR architecture supports two topologies: (1) single-ring, and (2) ring-of-rings.

There must be at least one CAR master and one CAR slave in any CAR topology. The smallest CAR possible is therefore a ring that includes one CAR master and one CAR slave connected in a single-ring topology.

Figure 2:
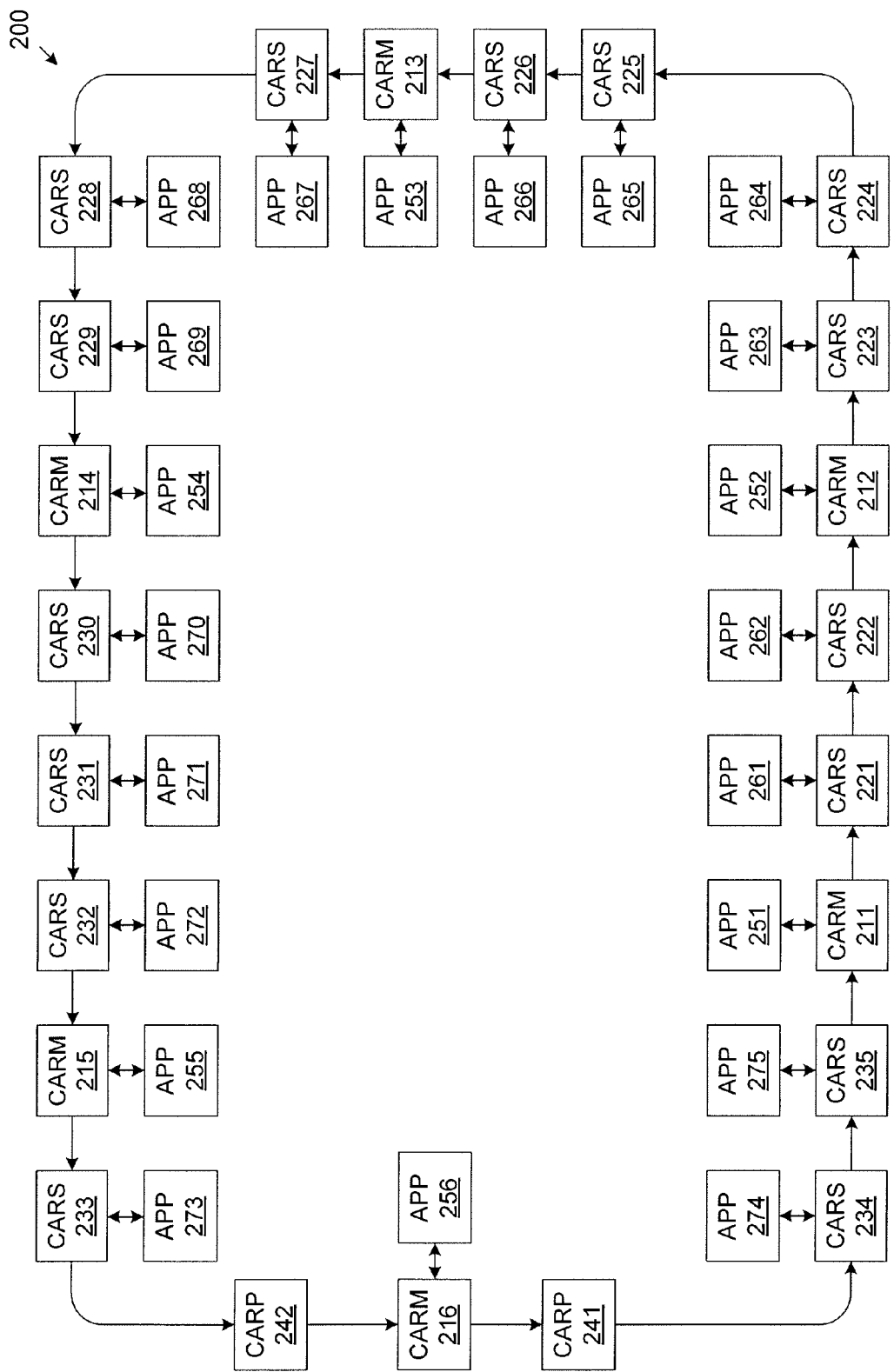
FIG. 2 is a block diagram of a common access ring system configured in a single-ring topology in accordance with one embodiment of the present invention.

FIG. 2 is a block diagram of a CAR 200 configured in a single-ring topology in accordance with one embodiment of the present invention. CAR 200 includes CAR masters 211-216, CAR slaves 221-235, and CAR pads 241-242. CAR masters 211-216 are coupled to application modules 251-256, respectively. CAR slaves 221-235 are coupled to application modules 261-275, respectively. As illustrated in FIG. 2, all of the nodes (e.g., CAR masters, CAR slaves and CAR pads) are connected together in a single ring. CAR messages, which are described in more detail below, travel between the nodes in a counterclockwise direction. In an alternate embodiment, the CAR messages may travel in a clockwise direction. The single-ring topology will typically be used for integrated circuit chips that: (1) require a limited number of nodes, (2) can tolerate the latency associated with the number of nodes in the ring, (3) do not have register shadow copies, (4) require a simple ring architectural design, and (5) require simple physical ring placement and routing. The single-ring topology must contain at least two CAR nodes, including one or more CAR masters and one or more CAR slaves. The single-ring topology may contain zero or more CAR pads, as necessary. The single-ring topology does not include any CAR bridges.

Figure 3:
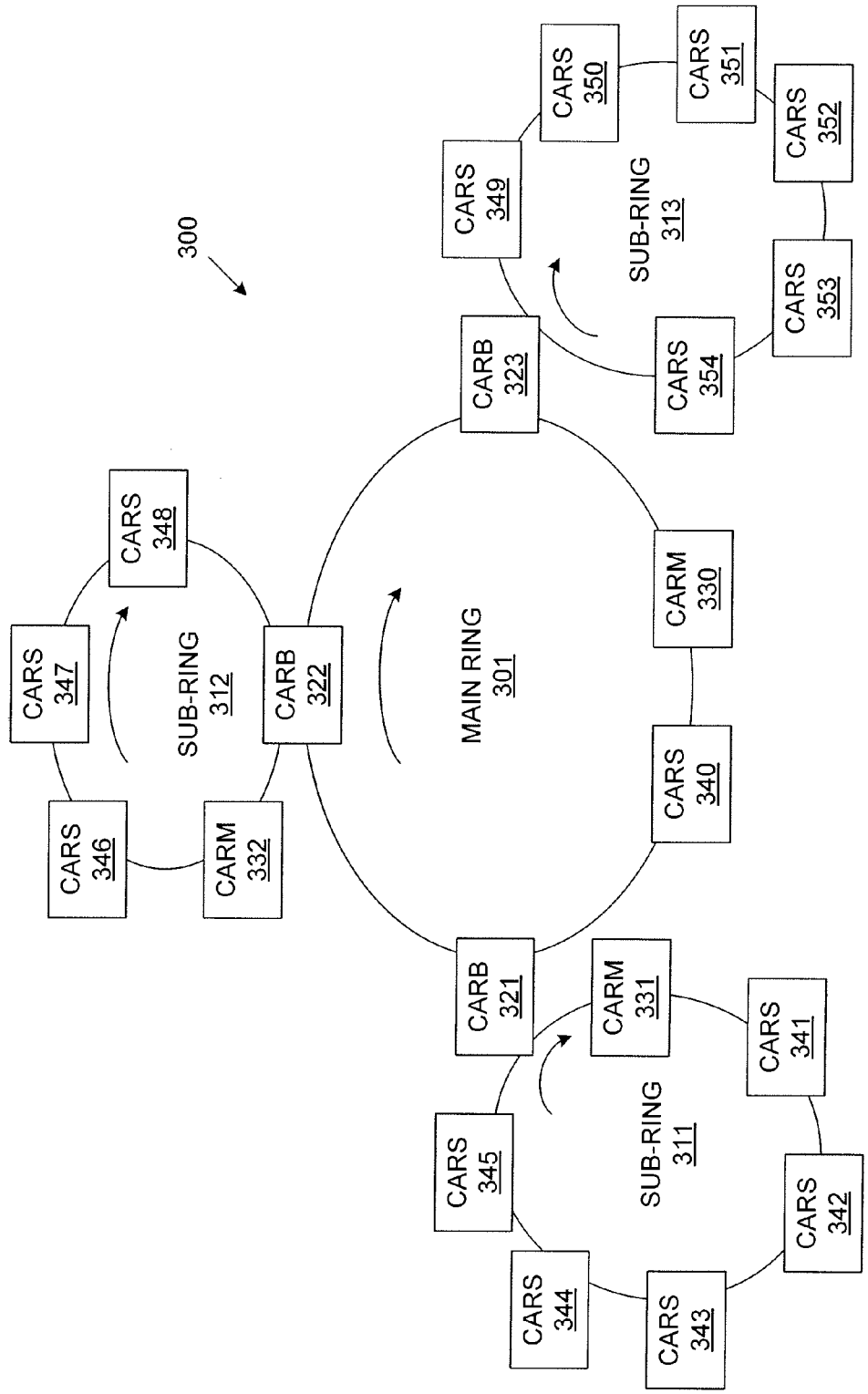
FIG. 3 is a block diagram of a common access ring system configured in a ring-of-rings topology in accordance with another embodiment of the present invention.

FIG. 3 is a block diagram of a CAR 300 configured in a ring-of-rings topology in accordance with another embodiment of the present invention. CAR 300 includes car bridges 321-323, CAR masters 330-332 and CAR slaves 340-354. Each of the CAR masters 330-332 and CAR slaves 340-354 is coupled to an associated application module, which is not shown for purposes of clarity. CAR 300 is organized into a main ring 301 and three sub-rings 311-313. In the illustrated example, CAR messages are transmitted in a clockwise direction in the main ring 301 and each of the sub-rings 311-313. Main ring 301 includes CAR master 330, CAR slave 340, and CAR bridges 321-323. Sub-ring 311 includes CAR bridge 321, CAR master 331 and CAR slaves 341-345. Sub-ring 312 includes CAR bridge 322, CAR master 332 and CAR slaves 346-348. Sub-ring 313 includes CAR bridge 323 and CAR slaves 349-354. In the described examples, the application modules associated with CAR master 330 and CAR slave 340 on the main ring 301 implement an SM bus (although this is not necessary). CAR master 330 and CAR slave 340 are placed directly on main ring 301, with CAR master 330 being located directly upstream of CAR slave 340.

The ring-of-rings topology will typically be used for integrated circuit chips that: (1) require a relatively large number of nodes, (2) cannot tolerate the latency that would exist if all of the nodes are placed in a single ring, (3) have groups of nodes that exhibit access locality (i.e., always interact with each other, but seldom interact with other nodes), and (4) have register shadow copies.

In the ring-of-rings topology, nodes that are related to each other (in terms of access locality or in terms of being in a shadow-copy group) are connected together in a sub-ring. These sub-rings are then connected together (using a CAR bridge module) to form the main-ring. The main ring must contain at least two nodes (not including CAR pads), and must contain one or more CAR bridges. The main ring can also include 0 or more CAR masters, CAR slaves and CAR pads. Each sub-ring must include at least two nodes, including one CAR bridge and one or more CAR slaves. Each sub-ring can also include up to one CAR master, and zero or more CAR pads, as necessary.

As described in more detail below, each sub-ring can be constructed to include nodes of a single functional group, a shadow-copy group, or a multiple function group.

A sub-ring constructed to include nodes of a single functional group is hereinafter referred to as a single functional group sub-ring. A single functional group sub-ring couples all of the CAR slaves belonging to the same functional group to the CAR master that needs access to these CAR slaves. The CAR master and all of the CAR slaves in this sub-ring have access locality, such that requests from the CAR master will be fulfilled by CAR slaves within the sub-ring most of the time. The fact that accesses are typically completed within this sub-ring greatly improves latency. In addition, any request that targets a different functional group is not forwarded into the sub-ring, thus further improving latency.

In accordance with one embodiment of the present invention, sub-ring 311 is a single functional group sub-ring. All of the CAR slaves 341-345 in this sub-ring manage registers/memories belonging to the same functional group. Each functional group is assigned a functional group identifier (FGID). There can only be one CAR master 331 in functional group sub-ring 311, and this CAR master 331 must be placed directly downstream of the corresponding CAR bridge 321. CAR slaves 341-345 are positioned within single functional group sub-ring 311 such that the CAR slaves that are more likely to fulfill a request are positioned upstream of CAR slaves that are less likely to fulfill a request. Thus, in FIG. 3, CAR slave 341 is more likely to fulfill a request from CAR master 331 than any of the other CAR slaves 342-345.

A sub-ring constructed to include nodes of a shadow copy group is hereinafter referred to as a shadow copy group sub-ring. A shadow copy group sub-ring couples all of the CAR slaves that have access to registers having shadow copies (i.e., both 'real' registers and their associated shadow copies). The CAR slaves in a shadow-copy group may not all belong to the same functional group. In fact, it is very likely that these CAR slaves will belong to different functional groups. Atomic access is guaranteed to all CAR slaves in the shadow copy group sub-ring because there are no CAR masters between these CAR slaves (i.e., there are no CAR masters in the shadow copy group sub-ring). The shadow-copy group sub-ring ensures that a data value written to a 'real' register will also be written to all shadow-copies, even if another CAR master is attempting to write a different data value to the same 'real' register. The shadow-copy group sub-ring accomplishes this by not allowing any subsequent write requests into the sub-ring until after the current write request has been propagated through all of the CAR slaves in the shadow-copy group sub-ring. Thus, the value stored in each 'real' register and the associated shadow-copies will always be synchronized.

In accordance with one embodiment of the present invention, there is one and only one shadow-copy group sub-ring per chip. All 'real' registers and their shadow-copies on the chip must be placed inside this shadow-copy group sub-ring to guarantee correct atomic shadow-write operation. Registers that have no shadow copies should not be placed inside the shadow-copy group sub-ring.

Sub-ring 313 in FIG. 3 is a shadow-copy group sub-ring. CAR slaves 349-354 in this sub-ring 313 manage all of the 'real' registers and all the associated shadow-copies. In accordance with the above description, there are no CAR masters in shadow-copy group sub-ring 313. The shadow-copy group sub-ring 313 is placed directly upstream of the CAR master 330 on main ring 301, and downstream of all other sub-rings 311-312 on main ring 301. As described in more detail below, this placement assures non-shadow-write accesses are completed before arriving at shadow-copy group sub-ring 313.

Moreover, as described in more detail below, any completed write request includes a completion status field that is set to a 'completed' state. If CAR bridge 323 of shadow-copy group sub-ring 313 receives a write request having a completion status field set to the 'completed' state, CAR bridge 323 simply bypasses shadow-copy group sub-ring 313 by forwarding the completed write request along the main ring 301 (i.e., to CAR master 330).

Any write request that is not marked as completed will enter the shadow-copy group sub-ring 313 if this sub-ring is not busy (i.e., there is no on-going write request inside sub-ring 313).

However, if shadow-copy group sub-ring 313 is busy, CAR bridge 323 sets the completion status field of the incoming write request to a 'busy' state, and bypasses shadow-copy group sub-ring 313 by forwarding this write request along the main ring 301 (i.e., to CAR master 330).

The shadow-copy group sub-ring 313 may be viewed as a single CAR slave. Each CAR slave handles one request at a time, and when a CAR slave accepts a request, the CAR slave will finish that request before handling another request. This operation is atomic. If a CAR slave is handling a request, the CAR slave will set the completion status field of any new incoming request to the 'busy' state. If a CAR slave receives an incoming request having a completion status field that is set to the 'completed' state, the CAR slave simply forwards this request downstream. The shadow-copy group sub-ring 313 behaves the same way as a single CAR slave, except there are multiple CAR slaves 349-354 in the shadow-copy group sub-ring 313. Thus, the writing to multiple shadow copies (i.e., multiple operations to different CAR slaves) is treated as a single operation encapsulated by the shadow-copy group sub-ring.

A sub-ring constructed to include nodes of multiple functional groups is hereinafter referred to as a multiple functional group sub-ring. The CAR slaves in the multiple functional group sub-ring manage registers/memories from multiple different functional groups. As a result, the associated CAR bridge needs to forward all requests into a multiple functional group sub-ring.

Note that it is desirable if a sub-ring only manages registers/memories from a single functional group. This configuration provides the best performance, because the associated CAR bridge can initially determine whether a request should be forwarded into the sub-ring based on the functional group identifier (FGID) of the request. If the functional group identifier of the request does not correspond with the single functional group of the sub-ring, then the CAR bridge does not forward the request to the sub-ring, thereby reducing access time.

However, to make the CAR architecture flexible, and to handle any unforeseen requirements, it is possible to handle multiple functional groups in a single sub-ring. In this mode, the CAR bridge will forward all requests into the multiple functional group sub-ring, regardless of the functional group identifier of the requests. The CAR slaves inside the multiple functional group sub-ring will determine if the request can be handled or not.

Note that if all of the sub-rings in a CAR having a ring-of-rings topology were configured to include multiple functional groups, then this CAR will behave like a CAR having a single-ring topology. That is, each request will pass through all of the nodes in this CAR, with none of the sub-rings being bypassed. Of course, the latency of this CAR will actually be longer than that of a single-ring counterpart, because of the additional CAR bridge nodes.

Sub-rings have the following usage restrictions in a ring-of-rings topology. In accordance with one embodiment of the present invention, if a sub-ring includes a CAR master, this CAR master is placed directly downstream of the associated CAR bridge (e.g., CAR bridge 321 and downstream CAR master 331). With this configuration, all of the CAR slaves in the sub-ring (e.g., CAR slaves 341-345) are downstream of the CAR master. Requests issued by the CAR master and serviced by the CAR slaves in the same sub-ring will have a completion status field set to the 'completed' state by the time the request arrives at the CAR bridge. The CAR bridge forwards the completed request to the main ring. All of the other sub-rings on the main ring are then bypassed in response to the 'completed' state of the completion status field in the request, thereby reducing latency.

Note that if the CAR master were not placed directly downstream of the associated CAR bridge in the sub-ring, a request from the CAR master may have to travel around the main ring (and possibly through several sub-rings) before returning to the original sub-ring to be processed by a CAR slave located upstream of the CAR master within the original sub-ring. This would greatly increase latency.

A shadow copy group sub-ring (e.g., sub-ring 313) is placed directly upstream of the CAR master 330 on the main ring 301. The CAR master 330, in turn, is placed upstream of sub-rings that handle different functional groups (e.g., sub-rings 311 and 312). This placement allows non-shadow-write requests (either issued by CAR master 330 or any of the functional groups) to be completed before these requests reach the shadow-copy group sub-ring 313. By completing the non-shadow-write requests in this manner, these requests do not have to enter the shadow-copy group sub-ring, which reduces latency.

By placing the shadow-copy group sub-ring 313 downstream of all the other sub-rings 311-312 on the main ring 301, non-shadow write requests are completed by a CAR slave on the main ring 301 (e.g., CAR slave 340) or in another sub-ring 311-312 by the time the request arrives at the shadow-copy group sub-ring 313. At this time, the non-shadow write request has a completion status field set to the 'completed' state. In response, the CAR bridge 323 associated with the shadow-copy group sub-ring simply forwards the non-shadow write request downstream within the main ring 301 (even if the shadow-copy group sub-ring 313 is busy with another request). In this manner, the completed non-shadow write request is routed back to the originating CAR master.

Note that all registers in all shadow copy groups must be placed inside the shadow copy group sub-ring 313 to guarantee that this mode of operation works correctly.

Common Access Ring Address

Addresses used in the CAR architecture will now be described. All software accessible registers/memories in a chip implementing the CAR architecture are assigned a 32-bit global address in a flat address space. To access a register/memory location, the correct 32-bit address must be specified.

FIG. 4 is a schematic diagram of a 32-bit global CAR address 400 in accordance with one embodiment of the present invention. CAR address 400 is divided into three parts, including a functional group identifier (FGID) 401, a target identifier (TID) 402, and a double-word address 403.

Functional group identifier 401 is a 6-bit field that specifies the functional group being accessed. In the described example, a total of 64 functional groups are allowed. These functional groups are used to broadly separate related logic of a chip into groups for ease of organization, logical design, physical design, and access. The user has full discretion on how the functional groups are assigned. For example, each port of a 16-port PCI Express switch chip can be assigned to a different functional group.

Target identifier 402 is a 6-bit field specifying the memory entity being accessed within the functional group. A total of 64 targets per functional group are allowed in the described embodiment. Target value '000000' is reserved to refer to registers. Other target values are used to refer to memory structures. Besides target value '000000', the user has full discretion for assigning the other target values.

Double-word address 403 is a 20-bit field that specifies a particular register/memory location of the target and function group specified by TID 402 and FGID 401, respectively. Each address refers to 32-bits of data. Access to data of less than 32 bits is possible with the use of a byte enable field in a corresponding CAR message (described below). For a write request, the byte enable field of the CAR message indicates the valid byte(s) in the data field of this message. For a read request, the byte enable field of the CAR message indicates the byte(s) to be read.

In accordance with an alternate embodiment of the present invention, target identifier 402 is eliminated, and the length of double-word address 403 is increased by 6-bits (to a 26-bit signal). In this embodiment, the 26-bit field specifies a particular register/memory location.

Common Access Ring Message

CAR messages will now be described. CAR masters use CAR messages to communicate requests to CAR slaves. Similarly, CAR slaves use CAR messages to response to CAR masters.

FIG. 5 is a schematic diagram of a CAR message 500 in accordance with one embodiment of the present invention. In this embodiment, CAR message 500 includes three double-words 501, 502 and 503. The first two double-words 501-502 are headers, which contain control information and the 32-bit CAR address. The 32-bit CAR address is broken up and placed in the first two double-words 501-502. More specifically, the functional group identifier 401 is placed in the first double-word 501, and the target identifier 402 and double-word address 403 are placed in the second double-word 502. Placing the functional group identifier 401 in the first double-word 501 of CAR message 500 advantageously allows each CAR node to immediately begin parsing the CAR message 500 upon receiving the first double word 501.

The first double word 501 also includes a requester identifier 511, which identifies the CAR node that has issued the CAR message 500, and a request type field 512, which identifies the request as a read request or a write request. The first double word 501 also includes a responder identifier 513, which identifies the last CAR node responding to the CAR message 500, and a completion status field 514, which identifies the current state of the CAR request. Finally, the first double word 501 includes a timeout flag (TO) 515 and a CARB congested bypass flag 516.

The second double word 502 also includes a byte enable field 517, which specifies bytes to be read and written during read and write operations. The last double-word 503 contains a 32-bit data field 518.

Tables 1 and 2 below specify the encoding of bits [31:0] of the first double-word 501 and the second double word 502, respectively, of the CAR message 500 in accordance with one embodiment of the present invention.

TABLE 1

Encoding of 1$^{st}$ Double-Word 501 of CAR Message 500

| BITS | FIELD | DESCRIPTION |
| --- | --- | --- |
| [31:24] | Requester ID | Specifies the CAR master making the request associated with the CAR message. |
| [23:20] | Request Type | Specifies the type of request. '0000' = read request '0001' = write request |
| [19:12] | Responder ID | Specifies the CAR slave or the CAR bridge that last modified the completion status field. |
| [11:8] | Completion Status | Specifies the current completion status of the CAR message. 0000 = No slave has handled this request 0001: CAR slave busy with another request (CAR master should re-try request) 0010: Request completed with no error |

TABLE 1-continued

Encoding of 1st Double-Word 501 of CAR Message 500

| BITS | FIELD | DESCRIPTION |
|---|---|---|
| | | 0011: Message error - parity error on upstream interface of a CAR node<br>0100: Message error - invalid request type in CAR message<br>0101: Reserved<br>0110: Reserved<br>0111: Parity error on CAR slave write data to application.<br>1000: Parity error on application read data to CAR slave<br>1001: Time Out<br>1010: Application returned invalid status to CAR slave.<br>1011 to 1111: Reserved |
| [7] | Time out flag | 0: no time out has occurred<br>1: time out has occurred<br>The time-out flag is activated by a CAR slave whenever a CAR message passes through a CAR slave that detects a time-out condition from its application. Once set, the time-out flag will not be cleared by any CAR node except the CAR master that originated the CAR message.<br>This flag informs the CAR master that the message has passed through at least one CAR slave that encountered a time-out.<br>It is possible that the CAR message passes through one or more CAR slaves that time-out and eventually arrives at a functioning CAR slave that the massage is meant for, and thus the message will be completed. In this case, the completion status is set to 'completed without error' and the time-out flag is set.<br>It is also possible that the CAR slave meant to receive the CAR message has the time-out condition. In this case, the completion status is set to 'access error time out' and the time-out flag is set. |
| [6] | CARB congested bypass flag | 0: This message is not being bypassed.<br>1: This message is being bypassed.<br>This flag is set by a CAR bridge when the CAR bridge is unable to route a CAR message due to congestion in a sub-loop. In this case, the CAR bridge passes the CAR message on the main loop, bypassing the sub-loop. |
| [5:0] | Functional Group ID (FGID) | Denotes a part of the chip to be accessed. FGID could denote different entities (e.g., different ports or non-port specific logic). EGID forms bits [31:26] of the global address of the register/memory location to be accessed. |

TABLE 2

Encoding of 2nd Double-Word 502 of CAR Message 500

| BITS | FIELD | DESCRIPTION |
|---|---|---|
| [31:30] | Reserved | Always '0' |
| [29:26] | Byte Enable | Specifies the valid byte(s) in the third double-word of the CAR message for a write request.<br>Specifies the byte(s) to be read for a read request. |
| [25:20] | Target ID (TID) | Denotes the target to be accessed within the functional group.<br>The target can be of type 'register' or 'memory'.<br>Encoding:<br>'0x00' = Registers<br>'0x01' to '0x3F' = RAMs and other memory structures.<br>The user can use these encodings to denote a subset of registers to break up registers into multiple sub-groups.<br>The TID forms bits [25:20] of the global address of the register/memory location to be accessed. |
| [19:0] | Double-Word Address (DWA) | Refers to a register or memory location in the target specified by the TID in the functional group specified by the FGID. Each address refers to 32-bits of data.<br>DWA forms bits [19:0] of the global address of the register/memory location to be accessed. |

Common Access Ring Operations

The CAR architecture supports 3 different operations, including read, write and shadow-write operations.

Even though the CAR architecture supports both write and shadow-write operations, software performing a write access (and thus, by extension, the CAR master which is invoked to request the write access) does not know the difference between a write operation and a shadow-write operation. The software and CAR master simply specify a write operation to a register/memory location having a certain 32-bit CAR address. The fact that this address may refer to a register that happens to have shadow copies is transparent to the software and CAR master.

The CAR architecture, with the help of the CAR slaves and their associated application modules, handles the automatic writing of all shadow copies when a write operation is being performed to a 'real' register. As described above, certain topological constraints in the CAR must be followed to guarantee that the writing of the 'real' register and the associated shadow copies is atomic. Note that write operations can only be specified to the 'real' register. The shadow copies are read-only and cannot be written directly.

Read Operation

A read operation is performed as follows in the CAR architecture in accordance with one embodiment of the present invention. The logic in an application module interacts with an associated CAR master to specify a read operation. In response, the CAR master transmits a CAR read request message onto the ring. The first double-word of this CAR read request includes the requester identifier associated with the CAR master, a request type field set to a value of '0000' to specify a read operation, and a completion status field set to '0000' to initially indicate that no CAR slave has handled the read request. The responder identifier of the first double-word is initially set to a null value or an identifier associated with the CAR master. The first double-word of the CAR read request message also includes the functional group identifier of the register/memory to be read.

The second double-word of the CAR read request message specifies the target identifier and the double-word address in the manner defined above in Tables 1 and 2. The second double-word of the CAR read request message also includes byte enable signals, which specify the byte(s) to be read from the target double-word. The third double-word of the CAR read request message is initially blank (or don't care), because the read data value has not yet been retrieved.

The CAR read request message travels through each CAR node on the ring. Each CAR slave receiving the CAR read request message checks the request type field and determines that the CAR message is a read request. The CAR slave then checks the functional group identifier field of the CAR message to determine whether the CAR slave may have access to the specified register/memory location. This is accomplished by comparing the functional group identifier of the CAR read request message with the functional group identifier associated with the CAR slave.

If the CAR slave detects a match, the CAR read request message is terminated (removed from the ring) and a read access is initiated to the application module connected to the CAR slave. The full 32-bit global read address is sent to the application module for address decoding. The byte enable field is also provided to the application module to specify the requested byte(s). In response, the application module returns the desired data to the CAR slave. The CAR slave then updates the completion status field of the CAR read request message to have a value of '0010', thereby indicating that the read access was completed with no errors. The CAR slave also updates the responder identifier field of the CAR read request message to indicate that the CAR slave was the last node to update the CAR message.

The updated CAR read request message (including the retrieved read data) is returned through the ring to the CAR master that originated the read request. No other CAR slaves on the ring will interact with the updated CAR message because the completion status field indicates that the read access has already been completed. CAR slaves receiving the updated CAR message will simply forward this message through the ring. The updated CAR message can be forwarded in this manner because all read operations only have one target. Thus, when a CAR slave has indicated that a read request has been serviced, the other CAR slaves do not have to process this read request access.

As described in more detail below, there can be multiple targets for a write operation (to support shadow-write operations). Therefore, even if a CAR slave indicates that it has completed a write request, other CAR slaves containing shadow copies may still have to process this write request. Write requests are therefore treated different than read requests.

Note that even if the functional group identifier of the CAR read request message matches the functional group identifier of a particular CAR slave, there is no guarantee that the application module connected to this CAR slave will include the register/memory location. This is because multiple CAR slaves can belong to the same functional group (and thus have the same functional group identifier). It is therefore possible for a CAR slave to access its associated application module in connection with a register/memory location that does not exist in this application module. In this case, the application module will inform the CAR slave of this fact. In response, the CAR slave simply forwards the CAR read request message down the ring to the next CAR slave. On the other hand, if the functional group identifier of the CAR read request message does not match the functional group of a particular CAR slave, the CAR read request message is ignored and forwarded down the ring to the next node.

Eventually, the CAR read request message is routed through the ring back to the CAR master that originated the message. The CAR master checks the requester identifier field of the CAR read request message to determine whether the CAR master had originally sent out the CAR message. If so, the CAR master terminates the CAR message and checks the completion status field to determine if there were any errors. If there are no errors, the data from the CAR message is returned to the application module connected to the CAR master, thereby completing the read operation initiated by the application module.

If the CAR master determines that it is not the requester of the CAR message (i.e., the requester identifier field does not match the requester identifier of the CAR master), the CAR master ignores the CAR message and forwards the CAR message to the next node on the ring.

Write Operation

A write operation is performed as follows in the CAR architecture in accordance with one embodiment of the present invention. The logic in an application module interacts with an associated CAR master to specify a write operation. In response, the CAR master transmits a CAR write request message onto the ring.

The first double-word of this CAR write request includes the requester identifier associated with the CAR master, a request type field set to a value of '0001' to specify a write operation, and a completion status field set to '0000' to initially indicate that no CAR slave has handled the write request. The responder identifier of the first double-word is initially set to a null value or an identifier associated with the CAR master. The first double-word of the CAR read request message also includes the functional group identifier of the register/memory to be written.

The second double-word of the CAR write request message specifies the target identifier and the double-word address in the manner defined above in Tables 1 and 2. The second double-word of the CAR write request message also includes byte enable signals, which specify the byte(s) to be written within the target double-word. The third double-word of the CAR read request message includes the data to be written to the target double-word.

The CAR write request message travels through each node on the ring. Each CAR slave receiving the CAR write request message checks the request type field and determines that the CAR message is a write request.

A hard-wired configuration bit in each CAR slave indicates whether the CAR slave has shadow copies or not. If a CAR slave has shadow copies, the CAR write request message is terminated (removed from the ring) and a write access is initiated by the application module connected to the CAR slave.

If the hard-wired configuration bit indicates that the CAR slave has no shadow copies, the CAR slave checks the functional group identifier field of the CAR write request message to determine whether the CAR slave may have access to the specified register/memory location. This is accomplished by comparing the functional group identifier of the CAR write request message with the functional group identifier assigned to the CAR slave.

If the CAR slave detects a match, the CAR write request message is terminated (removed from the ring) and a write access is initiated by the application module connected to the CAR slave.

To implement a write access with the application module, the CAR slave sends the full 32-bit global write address to the application module for address decoding. The write data and byte enable signals of the CAR write request message are also provided to the application module to specify the valid byte or bytes. In response, the application module performs a write operation, and returns the status of the write operation to the CAR slave. The CAR slave then updates the completion status field of the CAR write request message to have a value of '0010', thereby indicating that the write access was completed with no errors. The CAR slave also updates the responder identifier field of the CAR write request message to indicate that the CAR slave was the last to update the CAR message.

The updated CAR write request message is provided to the next downstream node of the ring. All other CAR slaves downstream of the current CAR slave will perform the same steps described above, thereby enabling multiple CAR slaves to respond to the same write request to fulfill a shadow write operation. However, note that if the completion status field provided by an upstream node indicates an error, then the downstream CAR slaves will not process the updated CAR write request message. Under this condition, the downstream CAR slaves will simply forward the updated CAR write request message to the CAR master that originally sent out the write request. Either way, the updated CAR write request message is eventually returned through the ring to the CAR master that originated the write request.

Upon receiving the updated CAR write request message, a CAR master checks the requester identifier field of the CAR message to determine whether the CAR master had originally sent out the CAR message. If so, the CAR master terminates the CAR message and checks the completion status field to determine if there were any errors. If there are no errors, the CAR master informs the associated application module that the write operation is complete. If the CAR master determines that it is not the requester associated with the updated CAR message, the CAR master ignores the updated CAR message and forwards this message to the next node on the ring.

Shadow-Write Considerations

The main consideration for a shadow-write operation is that this operation must be atomic. Thus, when management software writes to a 'real' register, the 'real' register, as well as all associated shadow copies, are written with the same value as specified by the software.

Another request to write to the same 'real' register (regardless of its timing in relation to the first request) in no way causes the 'real' register and the associated shadow copies to go out-of-sync. In accordance with one embodiment of the present invention, when a write operation is being performed to a register that has shadow copies, all other write operations to that register (and the associated shadow copies) are logically blocked until the first write operation has been completed to all copies.

The following requirements must be met when implementing a shadow-copy group. These requirements have been established in view of the following factors: (a) design and implementation complexity, (b) cost, (c) speed and latency, and (d) guarantee of atomic shadow-write operation.

All 'real' registers and the associated shadow copies are placed under the control of as few CAR slaves as possible. This group of CAR slaves is referred to as a shadow-copy group. For performance reasons, registers that have no associated shadow copies are not placed under the control of any CAR slave in the shadow-copy group. The ring-of-rings topology must be used, wherein all CAR slaves of the shadow-copy group are placed in a single sub-ring, which does not contain any CAR masters. The CAR bridge in the shadow-copy group sub-ring is hard-wired to specify that this CAR bridge controls a sub-ring for the shadow-copy group. Thus, this CAR bridge routes all CAR messages into the shadow-copy group sub-ring regardless of the value of the functional group identifier (FGID) in the CAR message. Each CAR slave in the shadow-copy group sub-ring is also hard-wired to specify that the CAR slave controls shadow copies.

To guarantee atomic operation, once a CAR write request message is routed into the shadow-copy group sub-ring, the associated CAR bridge blocks any subsequent write request messages from entering this sub-ring until the original write request message propagates through this sub-ring and back to the CAR bridge. While the shadow-copy group sub-ring is processing a first write request message, the CAR bridge sets the completion status field of subsequently received CAR write request messages to a '0001' value, thereby indicating that the CAR slaves in the shadow-copy group sub-ring are busy, and that the write request should be re-sent. The CAR bridge forwards the modified write request message downstream within the main ring. After the original write request message propagates through the shadow-copy group sub-ring and returns to the CAR bridge on the way back to the main ring, the CAR bridge will allow another write request message to enter the shadow-copy group sub-ring.

The latency of the CAR architecture is measured from the time that a CAR master sends a read request message on the ring until the requested data is returned to the CAR master. Examples of the expected latency of the CAR architecture are presented below. These expected latency values are conservative estimates. The actual latency values should be slightly better in actual implementation.

The first example estimates the latency associated with a single-ring topology having a total of 142 nodes, including 125 CAR slaves and 17 CAR masters. In this example, the CAR architecture and all of the associated application modules operate in response to a 250 MHz clock. Note that there are no shadow copies in the single-ring topology.

The CAR master originally transmits the read request (CAR) message over three clock cycles (i.e., one clock cycle for each of the three double-words in the read request message). The read request message is then transferred on the ring to the target CAR slave. Under worst case conditions, this will take approximately 710 clock cycles (i.e., approximately 5 clock cycles for the read request message to traverse each of the 142 nodes from an upstream interface to a downstream interface. The target CAR slave then receives the read request message, transmits the read request to the associated application module, and subsequently receives the read data from the application module. This process requires a minimum of 5 clock cycles per application module access. The target CAR slave then sends out the read completion message to the CAR master over three clock cycles (i.e., the read completion message has a length of three double words). The total latency is therefore approximately 721 clock cycles (or approximately 2884 nanoseconds at a clock frequency of 250 MHz).

The second example estimates the latency associated with a ring-of-rings topology having a total of 160 nodes, including 125 CAR slaves, 18 CAR bridges and 17 CAR masters. This example assumes there are: 16 functional group sub-rings, each having 6 CAR slaves, one CAR master and 1 CAR bridge; one multiple functional group sub-ring for non-specific logic including 12 CAR slaves and one CAR bridge; one shadow-copy group sub-ring including 16 CAR slaves and one CAR bridge; and a main ring having 1 CAR master and 1 CAR slave (plus the 18 CAR bridges associated with the sub-rings).

At the start of a read access, a CAR master in a sub-ring transmits a CAR read request message over three clock cycles (i.e., one clock cycle for each of the three double-words in the read request message). The read request message is then transferred on the sub-ring to the target CAR slave. Under worst case conditions, this will take approximately 25 clock cycles (i.e., approximately 5 clock cycles for the read request message to traverse each of the 5 (maximum) other CAR slaves in the sub-ring). Upon receiving the read request message, the target CAR slave transmits the read request to the associated application module, and subsequently receives the read data from the application module. This process requires a minimum of 5 clock cycles. The target CAR slave updates the read request message in the manner described above, and then transmits the updated read request message (which now includes the read data) downstream within the sub-ring over three clock cycles (i.e., the updated read request message has a length of three double words). In the ring-of-rings topology, the updated read request message travels through all of the CAR nodes in the main ring before returning to the original sub-ring in which the requesting CAR master resides. This path through the main ring requires an additional 100 clock cycles (i.e., 18 CAR bridges+1 CAR master+1 CAR slave, times 5 clock cycles per CAR node). The total latency for this ring-of-rings topology is therefore approximately 136 clock cycles (or approximately 544 nanoseconds at a clock frequency of 250 MHz).

Interfaces

In accordance with one embodiment of the present invention, there are four major interfaces implemented in the CAR architecture. These interfaces include: (1) an upstream ring interface, (2) a downstream ring interface, (3) a CAR master-application module (CARM/APP) interface, and (4) a CAR slave-application module (CARS/APP) interface.

Note that all CAR modules (CARM, CARS, CARB and CARP) use a single synchronous clock and a single synchronous reset signal. The clock and reset signals are not ring interface signals per se, because the ring does not carry the clock signal or the reset signal. However, the clock and reset signals are input signals to each of the CAR modules. In one embodiment, the maximum frequency of the clock signal is 250 MHz, and logic in the CAR modules is designed to transition only on the rising edges of the clock signal. This means that both the ring interfaces and the application module interfaces operate at the frequency of the clock signal. The user of the CAR can elect to run the CAR and the associated logic at a lower clock frequency at design time to better fit the CAR into the chip design. CAR modules may also have additional hard-wired configuration inputs.

Upstream Ring Interface

The upstream ring interface of a CAR node (i.e., CAR master, CAR slave, CAR bridge or CAR pad) is configured to receive a CAR message (ring_carX_data_i[31:0]), a parity value (ring_carX_prty_i[1:0]) and a message valid flag (ring_carX_valid_i) from an associated upstream CAR node. In the term 'carX', the value of X can be M, S, B or P to identify the upstream node as a CAR master, CAR slave, CAR bridge or CAR pad, respectively. Table 3 defines these required interface signals.

TABLE 3

Upstream Ring Interface signals

| SIGNAL | DIRECTION | DESCRIPTION |
| --- | --- | --- |
| ring_carX_data_i[31:0] | Input | Incoming CAR message from the upstream node in the CAR. The CAR message includes two header double words and one data double word (See, Tables 1 and 2). The CAR message requires 3 clock cycles to transfer. The message valid flag marks these three clock cycles. |
| ring_carX_prty_i[1:0] | Input | Even parity bits associated with ring_carX_data_i[31:16] and ring_carX_data_i[15:0]. |
| ring_carX_valid_i | Input | Message valid flag. Asserted to indicate the presence of a valid CAR message (ring_carX_data_i). De-asserted during a 1-cycle idle cycle between back-to-back CAR messages |

Downstream Ring Interface

The downstream ring interface of a CAR node is configured to send a CAR message (carX_ring_data_o[31:0]), a parity value (carX_ring_prty_o[1:0]) and a message valid flag (carX_ring_valid_o) to an associated downstream CAR node. Table 4 defines these required interface signals.

TABLE 4

Downstream Ring Interface signals

| SIGNAL | DIRECTION | DESCRIPTION |
| --- | --- | --- |
| carX_ring_data_o[31:0] | Output | Outgoing CAR message from the upstream node in the CAR. The CAR message includes two header double words and one data double word (See, Tables 1 and 2). The CAR message requires 3 clock cycles to transfer. The message valid flag marks these three clock cycles. |
| carX_ring_prty_o[1:0] | Output | Even parity bits associated with carX_ring_data_o[31:16] and carX_ring_data_o[15:0]. |
| carX_ring_valid_o | Output | Message valid flag. Asserted to indicate the presence of a valid CAR message (carX_ring_data_o). De-asserted during a 1-cycle idle cycle between back-to-back CAR messages. |

Figure 6:
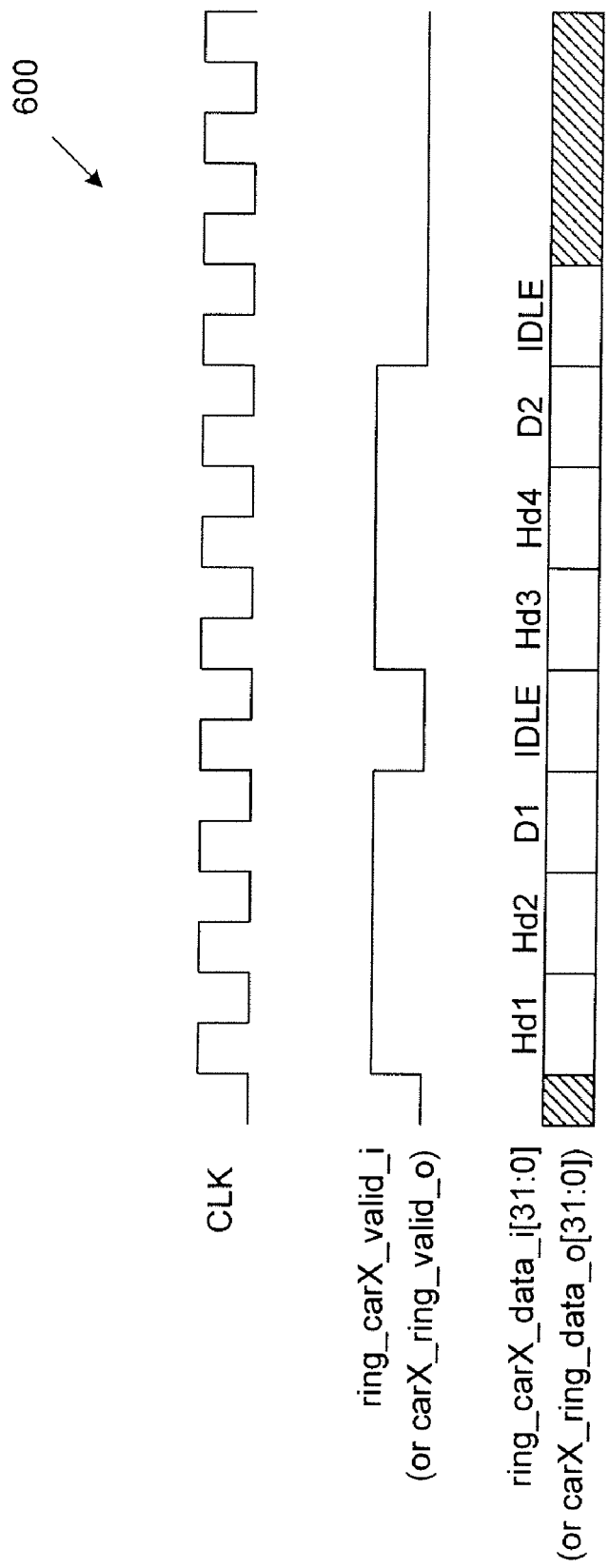
FIG. 6 is a timing diagram illustrating the relationship and timing of a CAR clock signal CLK, a CAR message, and a message valid flag of an upstream (or downstream) ring interface in accordance with one embodiment of the present invention.

FIG. 6 is a timing diagram illustrating the relationship and timing of the CAR clock signal CLK, a CAR message, and the message valid flag of an upstream (or downstream) ring interface. Note that both the upstream ring interface and the downstream ring interface exhibit the same transfer waveforms. As shown in FIG. 6, the three double words of the first CAR message (i.e., header Hd1, header Hd2 and data D1) are provided during three cycles of the clock signal CLK, while the message valid flag is activated. An idle cycle follows the first CAR message, wherein the message valid flag is de-activated. The three double words of the second CAR message (i.e., header Hd3, header Hd4 and data D2) are provided during the next three cycles of the clock signal CLK, while the message valid flag is activated. An idle cycle follows the second CAR message, wherein the message valid flag is de-activated.

CARM/APP Interface

The CARM/APP interface allows an application module to interface with a CAR master, thereby allowing the application module to make a read or write request on a register or memory location identified by the 32-bit global address. One 32-bit double-word is transferred between the application module and the CAR master.

The amount of time it takes for the data transfer to be completed is variable and depends on many factors, including: the topology of the ring (i.e., single-ring vs. ring-of-rings); the number of nodes on the ring; the type of operation; whether the target CAR slave is busy (i.e., is servicing a request from another CAR master); whether the application module associated with the target CAR slave is busy (i.e., the application module is busy handling traffic and thus can't service the access immediately.)

Table 5 defines interface signals used by the CARM/APP interface in accordance with one embodiment of the present invention.

TABLE 5

CARM/APP interface signals

| SIGNAL | DIRECTION (wrt CARM) | DESCRIPTION |
| --- | --- | --- |
| app_carm_req_i | Input | Transfer request from application module to CAR master. All information to the CAR master is valid while this signal is asserted. |
| app_carm_wr_i | Input | Direction of transfer: '0' = Read '1' = Write |
| app_carm_addr_i[31:0] | Input | Address of the double-word to be accessed. |
| app_carm_byte_en_i[3:0] | Input | Byte enable signals provided to the CAR master. Indicates which byte(s) in the data double-word contains valid data. |
| app_carm_wr_data_i[31:0] | Input | Write data to CAR master. |
| app_carm_wr_prty_i[1:0] | Input | Even parity bits associated with app_carm_wr_data_i[31:16] and app_carm_wr_data_i[15:0]. |
| carm_app_ack_o | Output | For read operations, this signal acknowledges the presence of valid read data on the carm_app_rd_data_o bus and the valid status on the carm_app_status_o bus. For write operations, this signal acknowledges the acceptance of the write data and the valid status on the carm_app_status_o bus. |
| carm_app_rd_data_o[31:0] | Output | Read data from the CAR master. |
| carm_app_rd_prty_o[1:0] | Output | Even parity bits associated with carm_app_rd_data_o[31:16] and carm_app_rd_data_o[15:0]. |
| carm_app_status_o[2:0] | Output | These bits report the status of the transaction: 0: Completed with No Error. |

TABLE 5-continued

CARM/APP interface signals

| SIGNAL | DIRECTION (wrt CARM) | DESCRIPTION |
|---|---|---|
| | | 1: Not completed - Invalid Address.
2: Not completed - Application time-out error.
3: Not completed - Message parity error.
4: Not completed - Message has invalid type.
5: Not completed - CAR slave data parity error (Application detected bad parity on write data from CAR slave).
6: Not completed - Application data parity error (CAR slave detected bad parity on read data from application).
7: Not completed - Invalid status (Application returned invalid status to CAR slave). |
| Carm_app_timeout_o | Output | When asserted, this signal indicates that at least one CAR slave has reported a time-out condition. This flag by itself does not indicate that an error has occurred for sure. It only lets the application know about the fact that one or more time-outs occurred.
For example, the application makes a request that travels down the ring and passes through a CAR slave which times out. At this point the carm_app_timeout_o flag is set, and the carm_app_status_o signal is set to identify an application time-out error.
As the request travels further down the ring and passes through the CAR slave which actually contains the register the application wishes to access, that CAR slave will complete the request and set the carm_app_status_o to 'completed with no error'. When the message is routed back to the CAR master, the application will be presented with this timeout flag set and the status 'completed with no error'.
In this case, the request is completed and there is no error. However, this time-out flag is set to inform the application of a time-out. |

TABLE 5-continued

CARM/APP interface signals

| SIGNAL | DIRECTION (wrt CARM) | DESCRIPTION |
|---|---|---|
| | | This flag is most useful when one of the CAR slaves in a shadow-copy group times out (most likely because it is being held at reset) while other CAR slaves in the group are OK. In this case, a write to the shadow-group will set the time-out flag and the status will be set to 'completed' (by the CAR slaves that are OK). However, because one CAR slave has timed out, it has not written the value to the shadow register copy. This creates an out-of-sync condition between the real register and its copies. This time-out flag will give the application an indication of this problems. Note that it is deemed acceptable to have the shadow copies be out of sync because part of the chip is at reset. |
| carm_app_responder_id_o[7:0] | Output | Specifies the CAR node which has responded to this application transaction request. The possible responders are CAR slaves and CAR bridges. The CAR master can also be a responder in the case where the CAR master detects a parity error on the write data when the application is making a write request. In this case, the CAR master responds with an error status. |

Figure 7:
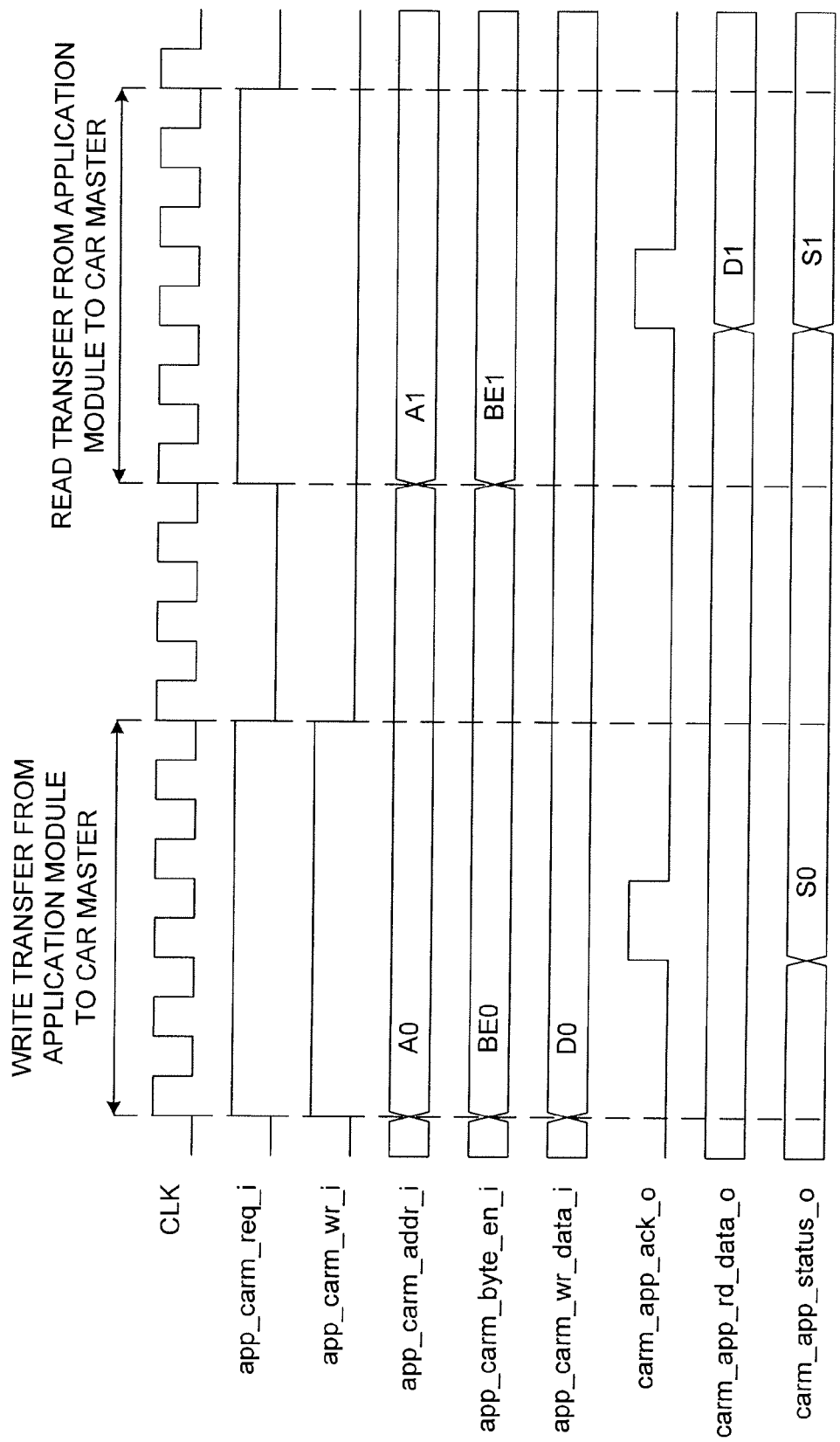
FIG. 7 is a waveform diagram that illustrates various signals during read and write transfers between a CAR master and an application module in accordance with one embodiment of the present invention.

FIG. 7 is a waveform diagram 700 illustrating the states of the signals of Table 5 during read and write transfers between a CAR master and an application module.

CARS/APP Interface

The CARS/APP Interface allows a CAR slave to interface with an application module to make a read or write request to a register or memory location based on the 32-bit global address. One 32-bit data double-word is transferred during the access between the CAR slave and the application module.

The amount of time it takes for the data transfer to be completed is variable and depends on many factors, including the type of operation and whether the application module is busy.

Table 6 defines interface signals used to implement the CARS/APP interface in accordance with one embodiment of the present invention.

TABLE 6

CARS/APP interface signals

| SIGNAL | DIRECTION (wrt CARS) | DESCRIPTION |
|---|---|---|
| cars_app_req_o | Output | Transfer request from CAR slave to application module. |

TABLE 6-continued

CARS/APP interface signals

| SIGNAL | DIRECTION (wrt CARS) | DESCRIPTION |
|---|---|---|
| | | All information provided to the application module is valid while this signal is asserted. |
| cars_app_wr_o | Output | Direction of transfer: '0' = Read '1' = Write |
| cars_app_addr_o[31:0] | Output | Address of the double-word to be accessed. |
| cars_app_byte_en_o[3:0] | Output | Byte enable signals provided to the application module. Indicates which byte(s) in the data double-word contains valid data. |
| cars_app_wr_data_o[31:0], | Output | Write data provided to application module. |
| cars_app_wr_prty_o[1:0] | Output | Even parity bits associated with cars_app_wr_data_o[31:16] and cars_app_wr_data_o[15:0]. |
| app_cars_ack_i | Input | For read operations, this signal acknowledges the presence of valid read data on the app_cars_rd_data_i bus and valid status on the app_cars_status_i bus. For write operations, this signal acknowledges the acceptance of the write data and the valid status on the app_cars_status_i bus. |
| app_cars_rd_data_i[31:0] | Input | Read data and parity from the application module. |
| app_cars_rd_prty_i[1:0] | Input | Even parity bits associated with app_cars_rd_data_i[31:16] and app_cars_rd_data_i [15:0]. |
| cars_app_status_o[2:0] | Input | These bits report the status of the transaction: 0: Completed with No Error 1: Not completed - Invalid address error. 2: Not completed - parity error. 3–7: Reserved |

Figure 8:
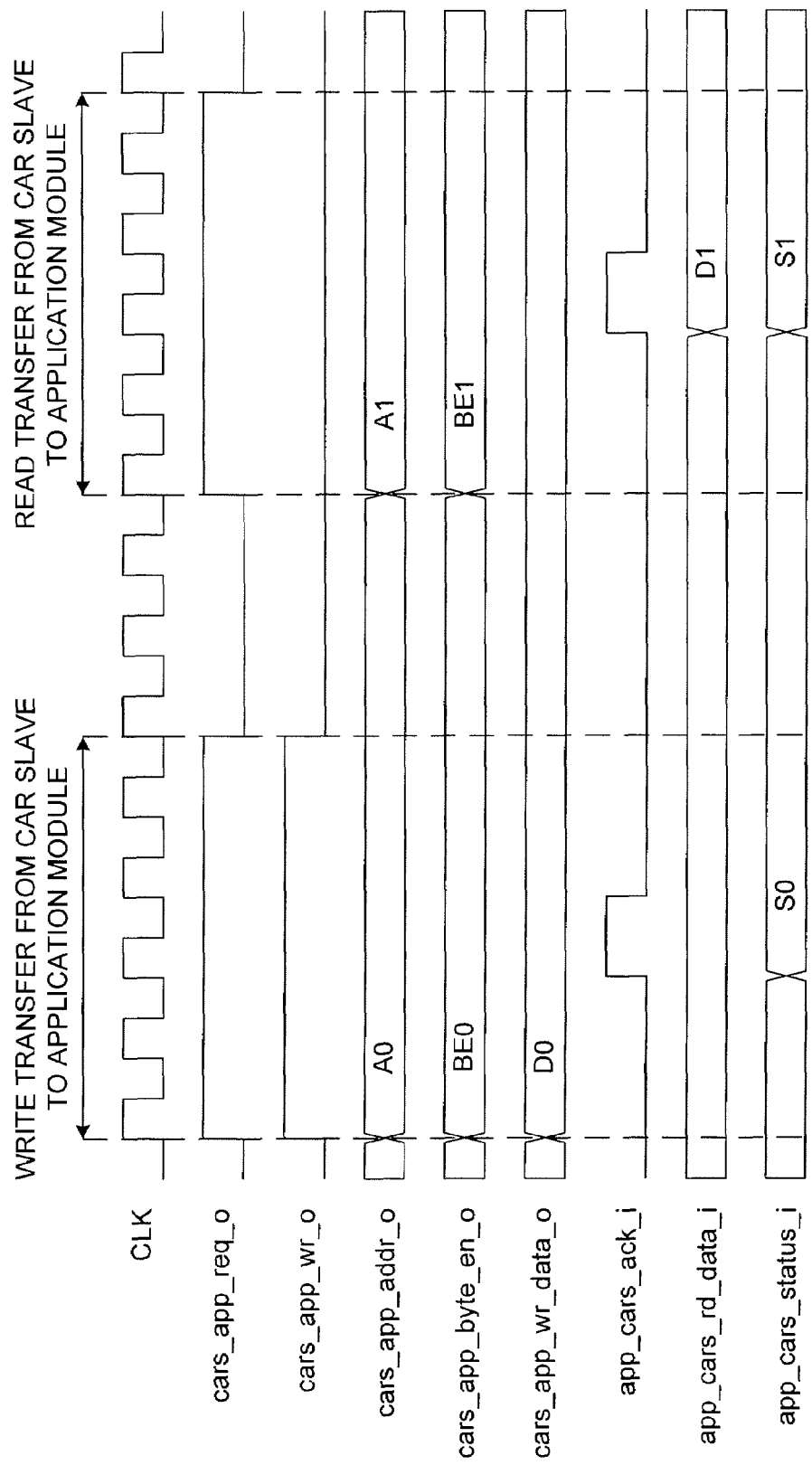
FIG. 8 is a waveform diagram illustrating various signals during read and write transfers between a CAR slave and an application module in accordance with one embodiment of the present invention.

FIG. 8 is a waveform diagram 800 illustrating the states of the signals of Table 6 during read and write transfers between a CAR slave and an application module.

CAR Master

Figure 9:
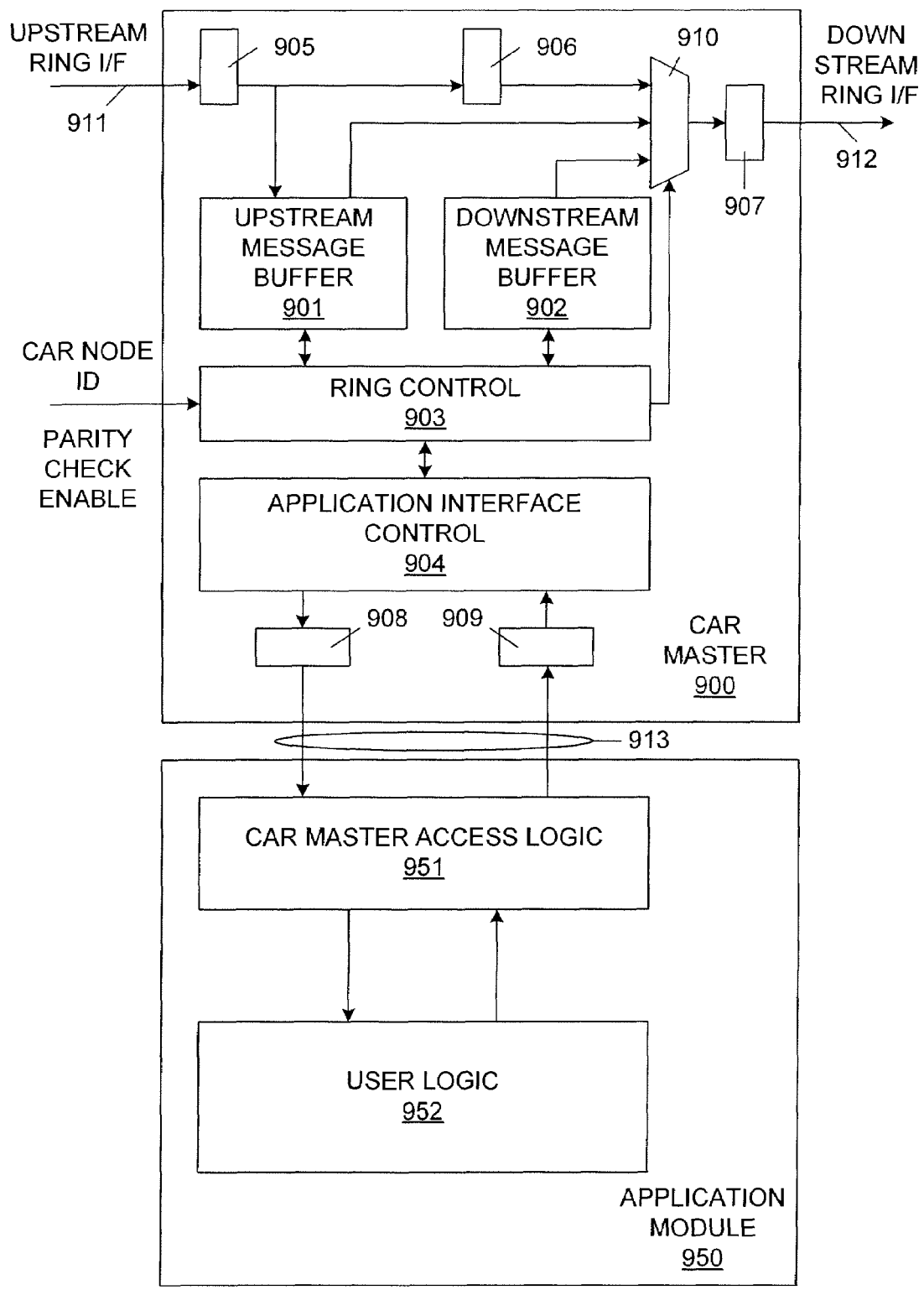
FIG. 9 is a block diagram of a CAR master and an associated application module in accordance with one embodiment of the present invention.

FIG. 9 is a block diagram of a CAR master 900 and an associated application module 950 in accordance with one embodiment of the present invention. CAR master 900 includes upstream message buffer 901, downstream message buffer 902, ring control circuit 903, application interface control circuit 904, registers 905-909 and multiplexers 910. CAR master 900 also includes upstream ring interface 911, downstream ring interface 912 and CARM/APP interface 913, which are described above. Application module 950 includes CAR master access logic 951 and user logic circuit 952.

CAR master 900 is coupled to receive hard-wired configuration data, which includes a CAR node identifier and parity check enable signals. The CAR node identifier is selected to uniquely identify CAR master 900. In accordance with one embodiment of the present invention, each CAR node on the chip must have a different CAR node identifier. The CAR node identifier is inserted into the requester identifier field of the CAR messages sent by CAR master 900 to the CAR slaves in the ring. The same requester identifier field is monitored by the CAR master 900 to determine if an incoming completion message is destined for this CAR master 900. The parity check enable signals are flags that instruct the CAR master 900 to enable (or disable) parity checking. One parity check enable signal controls parity checking on CAR related logic of the CAR master, including even parity checking on the upstream ring interface 911. Another parity check enable signal controls parity checking on application related logic of the CAR master, including even parity checking on the application interface 913.

Application module 950 may instruct CAR master 900 to generate a request CAR message via the CARM/APP interface 913. In response, CAR master 900 generates a CAR message and sends this message downstream on the ring via downstream message buffer 902, multiplexer 910 and register 907 and downstream ring interface 912.

Eventually, the CAR message comes back into CAR master 900 via upstream ring interface 911, register 905 and upstream message buffer 901. The CAR master 900 determines if the received CAR message is provided in response to the original request (by comparing the requester identifier in the CAR message with its own CAR node identifier). The CAR master 900 also checks the completion status field of the received CAR message. From the completion status field, CAR master 900 will be able to discern whether the request has been completed with no error, whether a CAR slave has handled the request, or whether a CAR slave did not process the request because it was busy. If the CAR message was successfully processed, the status and data (if the request was a read request), is sent to application module 950, thus completing the transaction.

Note that ring control circuit 903 controls multiplexer 910, thereby enabling (1) the data from the upstream interface 911 stored in register 906, (2) data provided by the upstream message buffer 901, or (3) data from the downstream message buffer 902 to be routed to the downstream ring interface 912.

CAR Slave

Figure 10:
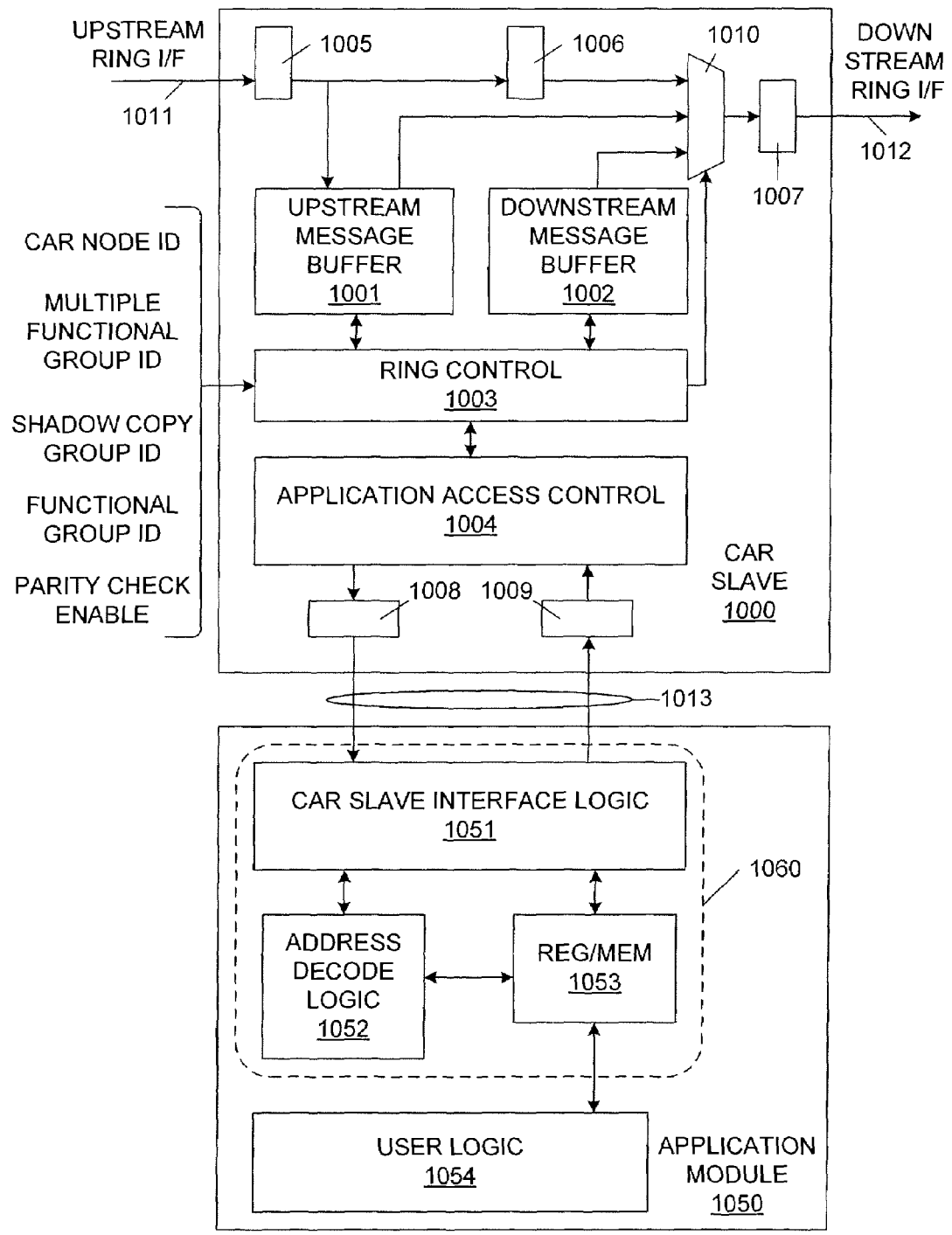
FIG. 10 is a block diagram of a CAR slave and an associated application module in accordance with one embodiment of the present invention.

FIG. 10 is a block diagram of a CAR slave 1000 and an associated application module 1050 in accordance with one embodiment of the present invention. CAR slave 1000, which has a layout similar to CAR master 900, includes upstream message buffer 1001, downstream message buffer 1002, ring control circuit 1003, application access control circuit 1004, registers 1005-1009 and multiplexer 1010. CAR slave 1000 also includes upstream ring interface 1011, downstream ring interface 1012 and CARS/APP interface 1013, which are described above. Application module 1050 includes CAR slave interface logic 1051 and user logic circuit 1052.

CAR slave 1000 is coupled to receive hard-wired configuration data, which includes a CAR node identifier and a parity check enable signal, which were described above in connection with CAR master 900. In addition, CAR slave 1000 receives a shadow copy group identifier, a multiple functional group identifier, and a functional group identifier. The shadow copy group identifier specifies whether the CAR slave 1000 has one or more registers that belong to a shadow-copy group. If the shadow-copy group identifier is asserted, the CAR slave 1000 will service all CAR write request messages, regardless of the functional group identifier specified in the CAR write request message, thereby supporting the shadow-write operations described above. The shadow copy group identifier is ignored for CAR read request messages.

The multiple functional group identifier specifies whether the CAR slave 1000 has registers that belong to more than one functional group. If the multiple functional group identifier is asserted, the functional group identifier field of each received CAR message is ignored, and the CAR slave 1000 services all CAR messages, regardless of the functional group identifier. In this case, application module 1050 will perform a full address decode to determine whether each request can be handled.

The functional group identifier field specifies the registers/memories that the CAR slave 1000 manages. The functional group identifier field is not used (i.e., is a don't care value) if the multiple functional groups flag is asserted.

CAR slave 1000 is coupled to receive a time-out value, which specifies the number of cycles the CAR slave will wait after issuing a request to the application. if the application does not respond within the specified time-out period, the CAR slave cancels the transaction and sends a completion message with a time-out error to the CAR master. The time-out bit in the message is also set. As described above, a downstream CAR slave may complete the request, and thus overwrite the completion status to a completed state. However, the time-out bit remains set to identify the time-out condition.

The time-out value is selected by taking into account the maximum number of cycles an application may need to respond to a transaction, and is selected to be high enough to avoid triggering false time-out errors. The time-out value can be set to zero to disable time-out checking.

The CAR slave 1000 checks the completion status field of each CAR message received from the upstream ring interface 1011. If the CAR slave 1000 determines that the completion status field of a message is set to the busy state, or includes any other error conditions, the CAR slave 1000 does not process the CAR message. Rather, the CAR slave 1000 simply forwards the CAR message downstream via multiplexer 1010, register 1007 and downstream interface 1012.

The CAR slave 1000 then checks the request type field and the functional group identifier field in the received CAR message. If the CAR slave 1000 determines that the request type is a read request, and the functional group identifier of the CAR message matches the CAR node identifier of the CAR slave 1000, then the CAR slave 1000 terminates and processes the CAR message. Alternately, if the CAR slave 1000 determines that the request type is a read request, and the multiple functional group identifier of the CAR slave 1000 is asserted, then the CAR slave 1000 terminates and processes the CAR message.

If the CAR slave 1000 determines that the request type is a write request, and the functional group identifier of the CAR message matches the CAR node identifier of the CAR slave 1000, then the CAR slave terminates and processes the CAR write request message.

Alternately, if the CAR slave 1000 determines that the request type is a write request, and the multiple functional group identifier of the CAR slave 1000 is asserted, then the CAR slave 1000 terminates and processes the CAR write request message. Moreover, if the CAR slave 1000 determines that the request type is a write request, and the shadow copy group identifier of the CAR slave 1000 is asserted, then the CAR slave 1000 terminates and processes the CAR write request message.

While a request is being processed by the CAR slave 1000, other CAR messages may arrive at CAR slave 1000. Any requests not intended for the CAR slave 1000 are not processed by the CAR slave 1000. Instead, these requests are forwarded downstream (via downstream ring interface 1012). However, if one of these CAR messages is intended for CAR slave 1000, then CAR slave 1000 updates the completion status field of the received CAR message to indicate that CAR slave 1000 is busy, and forwards the updated CAR message downstream. Setting the completion status field of the CAR message to a busy state will cause the originating CAR master to re-send the CAR message at a later time. By then, CAR slave 1000 may be free to handle the request.

To process a request, CAR slave 1000 transmits the received request type, address, byte enable, and data (for a write request) to application module 1050. Application module includes user logic 1054 and sub-module 1060. As described in more detail below, sub-module 1060 is generated by a CAR script, and includes CAR slave interface logic 1051, address decode logic 1052 and registers/memories 1053. This sub-module 1060 effectively couples user logic 1054 to CAR slave 1000.

Application module 1050 responds to the request (after asserting an acknowledge signal) by providing a status value and data (for a read request). There is no fixed time requirement (in terms of number of cycles) for the application module 1050 to respond to CAR slave 1000. Handshaking signals (e.g., request and acknowledge signals) are used to coordinate the request and response.

When application module 1050 has completed a transaction with CAR slave 1000, the CAR message is updated to include the new completion status (and the retrieved data for read operations). The responder identifier of the CAR message is also updated to reflect the CAR node identifier of CAR slave 1000. The updated CAR message is then forwarded downstream. At this time, CAR slave 1000 may begin to process another CAR message received from upstream ring interface 1011.

CAR Bridge

Figure 11:
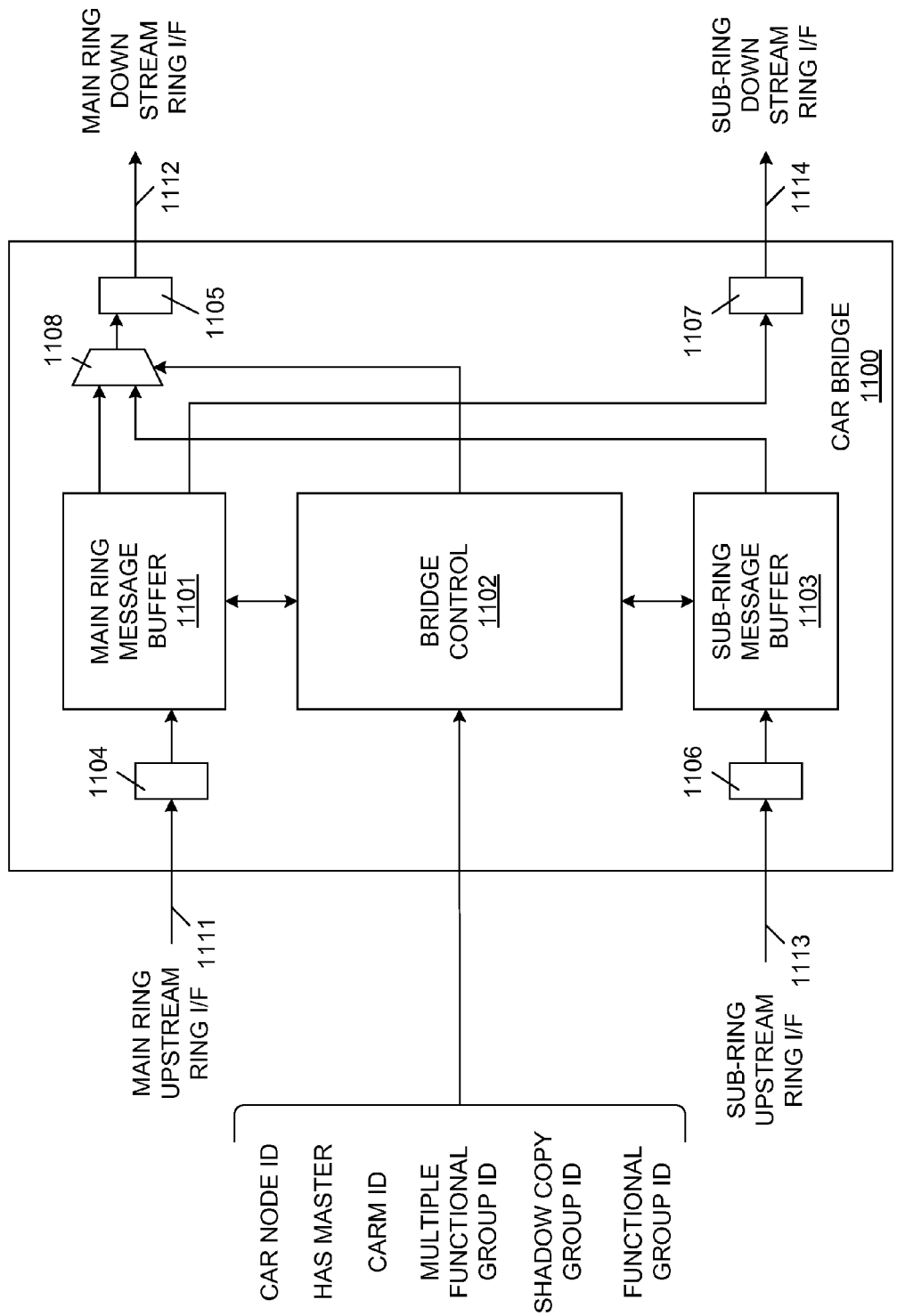
FIG. 11 is a block diagram of a CAR bridge in accordance with one embodiment of the present invention.

FIG. 11 is a block diagram of a CAR bridge 1100 in accordance with one embodiment of the present invention. As described above, CAR bridge 1100 is used to provide access to sub-rings in a ring-of-rings topology. CAR bridge 1100 includes main ring message buffer 1101, bridge control 1102, sub-ring message buffer 1103, registers 1104-1107 and multiplexer 1108. CAR bridge 1100 has four major interfaces, including main ring upstream ring interface 1111, main ring downstream ring interface 1112, sub-ring upstream ring interface 1113 and sub-ring downstream ring interface 1114.

Bridge control 1102 is coupled to receive hard-wired configuration data including: a CAR node identifier, a multiple functional group identifier, a shadow copy group identifier and a functional group identifier, which are described above in connection with FIGS. 9 and 10. In addition, bridge control 1102 is coupled to receive hard-wired configuration data that includes a 'has master' identifier and a CAR master identifier.

The 'has master' identifier provided to bridge control 1102 is asserted if there is a CAR master present in the sub-ring managed by CAR bridge 1100. If there is no CAR master present in this sub-ring, the 'has master' identifier is de-asserted. The CAR master identifier provided to bridge control 1102 corresponds with the unique CAR node identifier of the CAR master present in the sub-ring. Note that the CAR master identifier is only valid if the 'has master' identifier is asserted.

If CAR bridge 1100 modifies the completion status field of a CAR message, CAR bridge 1100 will insert its unique CAR node identifier into the responder identifier field of the CAR message.

The functional group identifier provided to bridge control 1102 specifies the functional group of the registers/memories in the sub-ring managed by CAR bridge 1100.

The shadow copy group identifier provided to bridge control 1102 is asserted if CAR bridge 1100 controls a sub-ring that has register(s) belonging to a shadow-copy group. When this shadow copy group identifier is asserted, CAR bridge 1100 will forward all write requests into the sub-ring (via sub-ring down-stream ring interface 1114) regardless of the functional group identifier of the write request. Note that the functional group identifier of the write request refers to the functional group of the 'real' register. Shadow copies of this 'real' register (if any) may exist in another functional group. Thus, to support shadow-write operations, CAR bridge 1100 must forward write requests to any functional group. To support atomic shadow-write operations, CAR bridge 1100 ensures that only one write request is pending within the associated sub-ring at any given time. CAR bridge 1100 ignores the shadow copy group identifier of incoming read requests.

The multiple functional group identifier provided to bridge control 1102 is asserted if CAR bridge 1100 controls a sub-ring that has register(s) belonging to more than one functional group. When the multiple functional group identifier is asserted, CAR bridge 1100 ignores the functional group identifier in received CAR messages. When the multiple functional group identifier is de-asserted, CAR bridge 1100 compares its associated functional group identifier with the functional group identifier of received CAR messages to determine whether a match exists.

CAR messages can enter CAR bridge 1100 from either the main ring upstream interface 1111 or the sub-ring upstream interface 1113. If a CAR message enters CAR bridge 1100 from the sub-ring upstream interface 1113, this message is always forwarded to the main ring downstream interface 1112 (via sub-ring message buffer 1103, multiplexer 1108 and register 1105). If a CAR message enters CAR bridge 1100 from the main ring upstream interface 1111, the handling of this message depends on the formation of the sub-ring as specified by the hard-wired configuration inputs to bridge control 1102. This handling is described in more detail below.

If the functional group identifier of the CAR message received from the main ring upstream interface 1111 matches the functional group identifier of CAR bridge 1100, the incoming message is forwarded to the sub-ring downstream interface 1114. Similarly, if the 'has master' flag is asserted, and the requester identifier field of the CAR message matches the CAR master identifier of CAR bridge 1100, the incoming message is forwarded to the sub-ring downstream interface 1114.

If the shadow copy group identifier provided to bridge control 1102 is asserted, the CAR message received from the main ring upstream interface 1111 is forwarded to the sub-ring downstream interface 1114, regardless of the functional group identifier in the CAR message.

If the multiple functional group identifier provided to bridge control 1102 is asserted, the CAR message received from the main ring upstream interface 1111 is forwarded to the sub-ring downstream interface 1114. Because all messages will enter the sub-ring in this case, this sub-ring configuration is typically not used.

CAR Script

The CAR script enables designers to create application modules that communicate with the CAR slaves in a consistent manner. The CAR script also automates the generation of all the registers and address decoding logic that are required in the application modules.

As input to the CAR script, the designer specifies the address, width, and attributes of all the registers/memories in an application module. The CAR script will then generate a sub-module in Verilog that contains the register flip-flops, address decode logic, and the interface logic to the CAR slaves. All the designer needs to do then is to instantiate the generated sub-module in the application module to fully utilize the functionality of the CAR architecture. Because the generated application module interfaces with the CAR slave, the designer of the application module is free from having to deal directly with the ring.

Although the present invention has been described in connection with various embodiments, it is understood that variations of these embodiments would be obvious to one of ordinary skill in the art. Thus, the present invention is limited only by the following claims.

What is claimed is:

1. A common access ring (CAR) network comprising:
   one or more CAR masters, each coupled to a corresponding application module;
   a first set of one or more CAR slaves, each coupled to a corresponding application module;
   one or more CAR bridges;
   a first bus structure coupling the one or more CAR masters, the first set of one or more CAR slaves and the one or more CAR bridges in a main ring;
   a second set of one or more CAR slaves; and
   a second bus structure coupling the second set of one or more CAR slaves and a first CAR bridge of the one or more CAR bridges in a first sub-ring, wherein the first CAR bridge couples the main ring and the first sub-ring, wherein each of the one or more CAR masters, each of the CAR slaves in the first and second sets of one or more CAR slaves, and the first CAR bridge are assigned unique CAR node identifiers, wherein the CAR network implements a global flat address space, and wherein each of the one or more CAR masters and each of the CAR slaves in the first and second sets of one or more CAR slaves are configured to transmit messages on the main ring and the first sub-ring without the use of tokens.

2. The CAR network of claim 1, further comprising a first CAR master coupled to the second bus structure, immediately downstream of the first CAR bridge, such that the first CAR master is included in the first sub-ring.

3. The CAR network of claim 1, further comprising:
a third set of one or more CAR slaves; and
a third bus structure coupling the third set of one or more CAR slaves and a second CAR bridge of the one or more CAR bridges in a second sub-ring, wherein the second CAR bridge couples the main ring and the second sub-ring.

4. The CAR network of claim 3, further comprising a first CAR master coupled to the second bus structure, immediately downstream of the first CAR bridge, such that the first CAR master is included in the first sub-ring.

5. The CAR network of claim 4, further comprising a second CAR master coupled to the third bus structure, immediately downstream of the second CAR bridge, such that the second CAR master is included in the second sub-ring.

6. The CAR network of claim 1, wherein the first and second bus structures each comprise a multi-bit bus.

7. The CAR network of claim 1, wherein each of the one or more CAR masters in the main ring is configured to transmit requests on the first bus structure, wherein a plurality of requests may simultaneously exist on the main ring.

8. The CAR network of claim 7, wherein the one or more CAR masters, the first set of one or more CAR slaves and the one or more CAR bridges are configured to transfer requests in a serial manner around the main ring on the first bus structure, such that no more than one of the requests is received by any one of the one or more CAR masters, the first set of one or more CAR slaves or the one or more CAR bridges at any given time.

9. The CAR network of claim 1, wherein each of the one or more CAR masters in the main ring is configured to transmit requests on the first bus structure without arbitration.

10. The CAR network of claim 1, wherein each of the one or more CAR masters is configured to transmit requests in a single direction on the main ring.

11. The CAR network of claim 1, wherein each CAR slave in the first set of one or more CAR slaves comprises:

a decoder configured to determine whether requests on the main ring are directed to the corresponding CAR slave; and a control circuit configured to transmit a response to a CAR master upon determining that a request on the main ring is directed to the CAR slave, wherein the response is transmitted on the main ring.

12. The CAR network of claim 11, wherein each of the CAR masters is configured to transmit requests in a single direction on the main ring, and each of the CAR slaves is configured to transmit responses in the same direction on the main ring.

13. The CAR network of claim 11, wherein the control circuit is further configured to access the application module associated with the CAR slave upon determining that a request on the main ring is directed to the CAR slave, wherein the response is prepared in response to the access of the application module.

14. The CAR network of claim 1, wherein the main ring is configured to simultaneously propagate requests from two or more of the CAR masters.

15. The CAR network of claim 1, wherein each request issued by a CAR master includes a unique CAR node identifier corresponding with a CAR slave to be accessed.

16. The CAR network of claim 15, wherein each request issued by a CAR master further includes a unique CAR node identifier corresponding with the CAR master.

17. The CAR network of claim 15, wherein each request issued by a CAR master includes a completion status field, which identifies whether the request has been serviced by a CAR slave.

18. The CAR network of claim 1, wherein the main ring is configured such that a request transmitted on the main ring is transmitted through each of the one or more CAR masters, each CAR slave in the first set of CAR slaves, and each of the one or more CAR bridges.

19. The CAR network of claim 1, further comprising an external access mechanism coupled to the main ring.

20. The CAR network of claim 19, wherein the external access mechanism comprises a serial mode bus or a management port.

21. The CAR network of claim 1, wherein each of the one or more CAR masters is configured to transmit request messages on the main ring, and wherein the first CAR bridge is configured to receive the request messages and determine whether the received request messages require access to the second set of CAR slaves.

22. The CAR network of claim 21, wherein the first CAR bridge is further configured to route request messages that do not require access to the second set of CAR slaves along the main ring, without entering the first sub-ring.

* * * * *